(12) United States Patent
Georgeson et al.

(10) Patent No.: US 9,085,052 B1
(45) Date of Patent: Jul. 21, 2015

(54) STRUCTURAL REPAIR HAVING OPTICAL WITNESS AND METHOD OF MONITORING REPAIR PERFORMANCE

(75) Inventors: Gary E. Georgeson, Tacoma, WA (US); Kenneth Harlan Griess, Kent, WA (US); Russell Lee Keller, Maple Valley, WA (US); Everett A. Westerman, Jr., Auburn, WA (US)

(73) Assignee: The Boeing Company, Chicago, IL (US)

( * ) Notice: Subject to any disclaimer, the term of this patent is extended or adjusted under 35 U.S.C. 154(b) by 148 days.

(21) Appl. No.: 13/310,539

(22) Filed: Dec. 2, 2011

Related U.S. Application Data

(60) Provisional application No. 61/482,737, filed on May 5, 2011.

(51) Int. Cl.
| | |
|---|---|
| *B23P 6/00* | (2006.01) |
| *G01B 11/16* | (2006.01) |
| *G01B 15/06* | (2006.01) |
| *G01L 1/24* | (2006.01) |
| *B32B 33/00* | (2006.01) |
| *B32B 43/00* | (2006.01) |

(52) U.S. Cl.
CPC . *B23P 6/00* (2013.01); *G01B 11/16* (2013.01); *G01B 15/06* (2013.01); *G01L 1/24* (2013.01); *B32B 33/00* (2013.10); *B32B 43/00* (2013.01); *B32B 2307/422* (2013.01); *B32B 2556/00* (2013.01)

(58) Field of Classification Search
CPC ............ B23P 6/00; B23P 6/04; B32B 33/00; B32B 43/00; B32B 2307/40; B32B 2307/422; B32B 2556/00; G01B 11/16; G01B 15/06; G01L 1/24; G01L 1/247; G01L 1/25
USPC .................. 73/762; 116/201, 212; 29/407.08, 29/407.04, 897.1
See application file for complete search history.

(56) References Cited

U.S. PATENT DOCUMENTS

| | | | |
|---|---|---|---|
| 4,015,465 A * | 4/1977 | Scott | 73/800 |
| 4,436,999 A | 3/1984 | Kern | |
| 4,492,121 A | 1/1985 | Lehto | |
| 4,509,370 A | 4/1985 | Hirschfeld | |
| 4,784,811 A | 11/1988 | Hirschfeld | |
| 4,921,770 A * | 5/1990 | Murayama et al. | 430/76 |

(Continued)

FOREIGN PATENT DOCUMENTS

JP     06313738A2 A2     11/1994

OTHER PUBLICATIONS

Gertz Likhtenshtein, "Stilbenes Preparation and Analysis", excerpt from "Stilbenes: Applications in Chemistry, Life Sciences and Materials Science", published Dec. 2, 2009, Wiley, pp. 1-9.*

(Continued)

*Primary Examiner* — Alexander P Taousakis
*Assistant Examiner* — Matthew P Travers
(74) *Attorney, Agent, or Firm* — Yee & Associates, P.C.

(57) ABSTRACT

A structural repair includes a tell-tale optical witness that allows the health of the repair to be visually monitored. The optical witness includes a stress sensitive fluorescent dye that shows changes in local strain/stress patterns when the repair is subjected to electromagnetic energy of a particular wavelength. The dyes fluoresce more or less strongly as a function of the local stress/strain.

14 Claims, 17 Drawing Sheets

(56) References Cited

U.S. PATENT DOCUMENTS

| | | | |
|---|---|---|---|
| 5,132,530 A | | 7/1992 | Groh et al. |
| 5,177,805 A | | 1/1993 | Groger et al. |
| 5,300,356 A | | 4/1994 | Dempster et al. |
| 5,330,718 A | | 7/1994 | Hui et al. |
| 5,438,879 A | | 8/1995 | Reda |
| 5,490,426 A | | 2/1996 | Shiga et al. |
| 5,756,356 A | | 5/1998 | Yanagi et al. |
| 5,817,945 A | * | 10/1998 | Morris et al. ............... 73/800 |
| 5,963,310 A | | 10/1999 | Brown et al. |
| 6,263,736 B1 | | 7/2001 | Thundat et al. |
| 6,311,557 B1 | | 11/2001 | Davis et al. |
| 6,327,030 B1 | * | 12/2001 | Ifju et al. ..................... 356/32 |
| 6,442,316 B1 | | 8/2002 | Rossi et al. |
| 6,808,804 B2 | | 10/2004 | Hotaka et al. |
| 7,037,973 B2 | | 5/2006 | Botros et al. |
| 7,127,950 B2 | | 10/2006 | Fonov et al. |
| 7,246,570 B2 | | 7/2007 | Weng et al. |
| 7,285,313 B2 | | 10/2007 | Kim et al. |
| 7,398,698 B2 | * | 7/2008 | Griess et al. ................. 73/801 |
| 7,862,888 B2 | | 1/2011 | Toyama et al. |
| 8,038,815 B2 | | 10/2011 | Bailey et al. |
| 2006/0286407 A1 | | 12/2006 | Amano et al. |
| 2007/0100582 A1 | | 5/2007 | Griess et al. |
| 2008/0223152 A1 | * | 9/2008 | Georgeson et al. ...... 73/862.041 |
| 2008/0278722 A1 | * | 11/2008 | Cunningham et al. ........ 356/317 |
| 2008/0293095 A1 | | 11/2008 | Jelinek |
| 2009/0036304 A1 | | 2/2009 | Misner et al. |
| 2010/0227105 A1 | | 9/2010 | Dan-Jumbo et al. |
| 2010/0227106 A1 | | 9/2010 | Dan-Jumbo et al. |
| 2010/0227117 A1 | | 9/2010 | Dan-Jumbo et al. |
| 2010/0276064 A1 | | 11/2010 | Blanchard et al. |
| 2010/0276065 A1 | | 11/2010 | Blanchard et al. |
| 2011/0123712 A1 | | 5/2011 | Becker, IV et al. |
| 2011/0132523 A1 | | 6/2011 | Evens et al. |
| 2011/0316712 A1 | * | 12/2011 | Mciver et al. ................. 340/665 |
| 2012/0115719 A1 | * | 5/2012 | Turner et al. ................. 503/216 |

OTHER PUBLICATIONS

"Tetra vs Tert—Google Example.pdf".*
U.S. Appl. No. 13/310,333, filed Dec. 2, 2011, Toivola et al.
Tiovola et al., "Method of Detecting Inconsistencies in Composite Structures and Stress Sensitive Coatings Used Therein," U.S. Appl. No. 13/310,333, filed Dec. 2, 2011, 53 pages.
Georgeson et al., "Monitoring Composite Manufacturing and Repair Processes Using Chromatic Film," U.S. Appl. No. 13/791,207, filed Mar. 8, 2013, 38 pages.
Cantwell et al., "An Assessment of the Impact Performance of CFRP Reinforced with High-strain Carbon Fibres," Composite Science and Technology, vol. 25, Issue 2, 1986, pp. 133-148.
Morton et al., "Impact Response of Tough Carbon Fibre Composites," Composite Structures, vol. 13, Issue 1, 1989, pp. 1-19.
Kumar et al., "Delaminations of barely visible impact damage in CFRP laminates," Composite Structures, vol. 23, No. 4, 1993, pp. 313-318.
Poon et al., "Assessment of Impact Damage in Toughened Resin Composites," Theoretical and Applied Fracture Mechanics, vol. 13, Issue 2, 1990, pp. 81-97.
Van Keuren et al., "Three-dimensional thermal imaging using two-photon microscopy," Journal of Physics D.: Applies Physics, vol. 37, No. 20, Sep. 2004, pp. 2938-2943.
Drickamer et al., "Two Examples of Pressure Tuning Spectroscopy in Solid Polymeric Media," Ind. Eng. Chem Res., vol. 40, No. 14, Apr. 2001, pp. 3038-3041.
Woo et al., "Solvent Effects on the Two-Photon Absorption of Distyrylbenzene Chromophores," J. Am. Chem. Soc., vol. 127, Issue 42, Sep. 2005, pp. 14721-14729.
Birks, "Excimers," Rep. Prog. Phys., vol. 38, No. 8, 1975, pp. 903-974.
Wu et al., "Enhancement of Aggregation-Induced Emission in Dye-Encapsulating Polymeric Micelles for Bioimaging," Advanced Functional Materials, vol. 20 Issue 9, May 2010, pp. 1413-1423.
Luo et al., "Aggregation-induced emission of 1-methyl-1,2,3,4,5-pentaphenylsilole," Chem. Commun., Aug. 2001, pp. 1740-1741.
Lowe et al., "Oligo(p-phenylene vinylene) Excimers as Molecular Probes: Deformation-Induced Color Changes in Photoluminescent Polymer Blends," Adv. Mater., Nov. 2002, vol. 14, No. 22, 1625-1629.
Yang et al., "Excimer Formation in Uniaxially Stretched Polymer Films," Journal of Applied Polymer Science, vol. 82, Issue 10, Dec. 2001, pp. 2347-2351.
"Technical Data, Desoprime CF/CA 7501," PPG Aerospace, Feb. 2010, 2 pages, accessed Sep. 23, 2011, http://www.ppg.com/coatings/aerospace/coatings/coatingsproducts/Documents/Desoprime_CF_CA_7501.pdf.
"Technical Data, Desothane HS Buffable Clear Topcoat CA 8800/B900," PPG Aerospace, Feb. 2010, 2 pages, accessed Sep. 23, 2011, http://www.ppg.com/coatings/aerospace/coatings/coatingsproducts/Documents/Desothane_HS_Buffable_Clear_Topcoat_CA_8800_B900.pdf.
"Standard Test Method for Assignment of the Glass Transition Temperature by Dynamic Mechanical Analysis," Designation E 1640-04, ASTM International, 5 pages.
Toivola et al., "Stress Sensitive Fluorescent Dyes for Damage Detection in Aerospace Primers & Coatings," SEMPE 2011 Conference and Exhibition Conference Program, Long Beach, CA, May 2011, 17 pages.
Non-final office action dated Dec. 6, 2013 regarding U.S. Appl. No. 13/310,333, 27 pages.
Notice of Allowance dated Feb. 6, 2014 regarding U.S. Appl. No. 13/310,333, 10 pages.

* cited by examiner

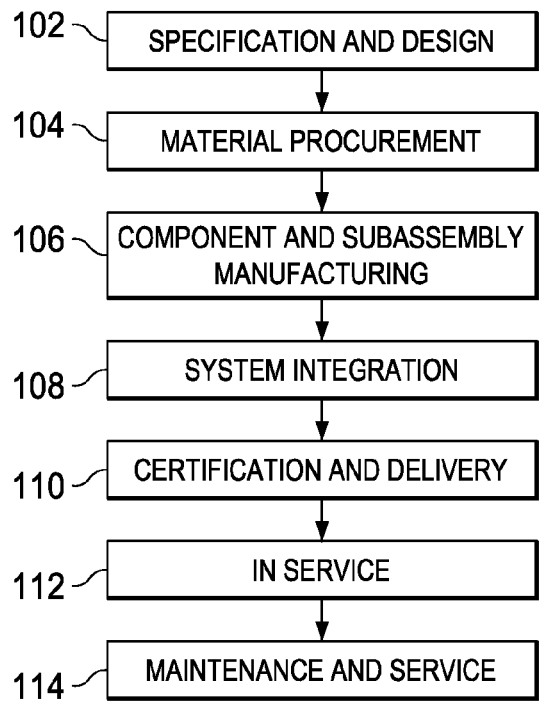
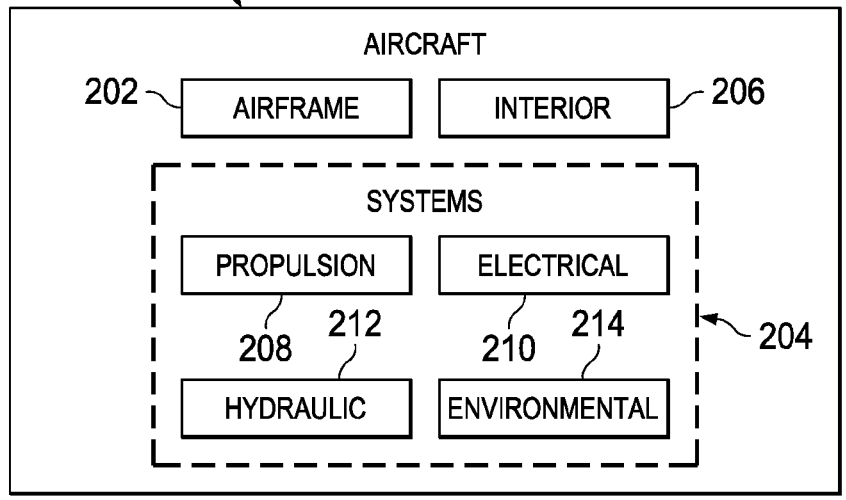

FIG. 5
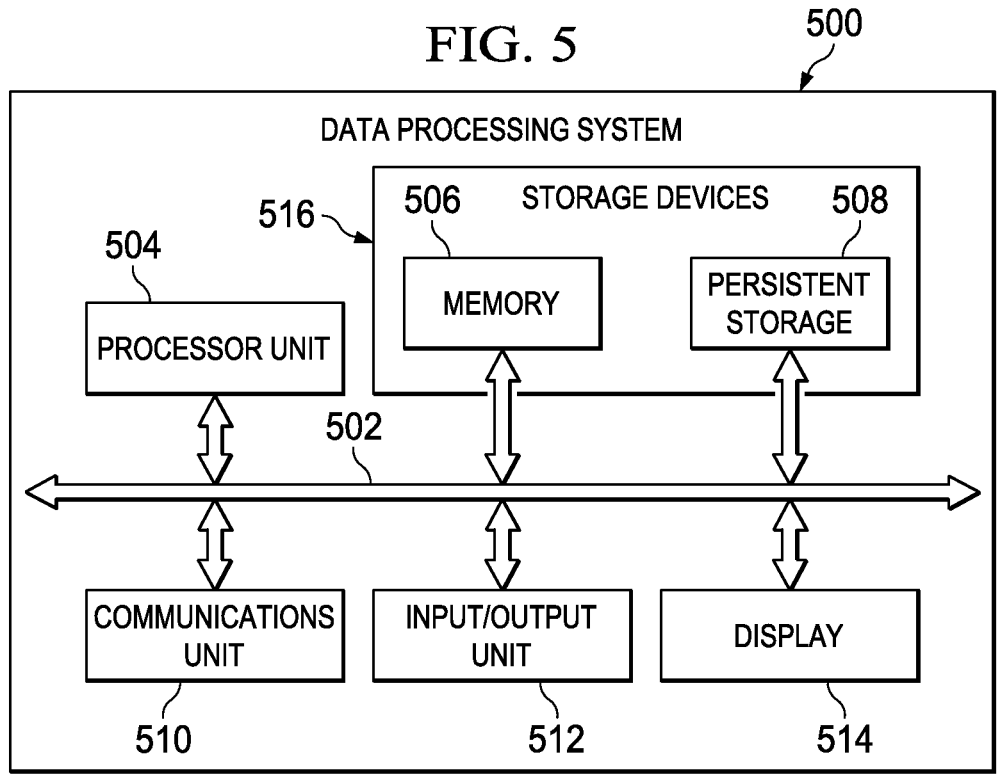
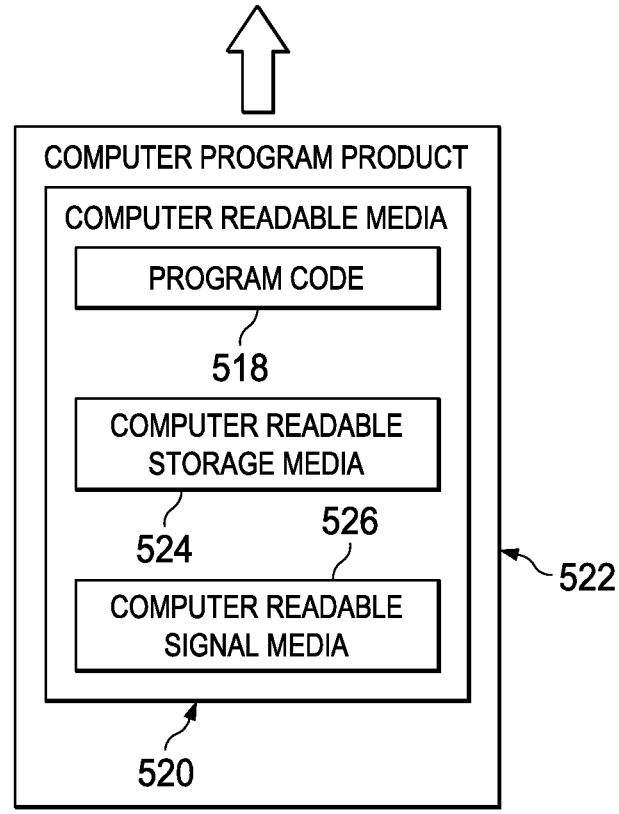

STRUCTURAL REPAIR HAVING OPTICAL WITNESS AND METHOD OF MONITORING REPAIR PERFORMANCE

CROSS REFERENCE TO RELATED APPLICATIONS

This application claims the benefit of Provisional U.S. Patent Application No. 61/482,737 filed May 5, 2011, which is incorporated by reference herein in its entirety. This application is also related to co-pending U.S. patent application Ser. No. 13/310,333, filed on even date herewith, which is incorporated by reference herein in its entirety.

BACKGROUND INFORMATION

1. Field

The present disclosure relates generally to manufacturing and servicing vehicles, especially aircraft. More particularly, the present disclosure relates to a method of repairing or reworking inconsistencies in components of the aircraft that allow the performance of the repair to be monitored using optical inspection techniques.

2. Background

Monitoring the health, state, and/or quality of on-aircraft bonded structural repairs, such as doubler repairs on composites or metals, can be expensive and challenging using traditional NDE (non-destructive evaluation) equipment. The use of a trained NDE technician to inspect a repair for signs of early degradation can be time consuming and may require the aircraft to be taken out of service while the inspection is performed. Also, bond testers and ultrasonic test equipment typically used to perform the inspection maybe too costly for smaller airlines. Current techniques for structural health monitoring of repairs require equipment that flies with the airplane or connects into circuitry attached to sensors that are pulsed to check the repair with ultrasonic structural waves. These systems are costly and can add undesired weight to the aircraft.

Accordingly, there is a need for a simple and rapid method of detecting initial signs of degradation of a repair, such as a loss of adhesion or a change in its strain pattern. There is also a need for a repair that incorporates a tell-tale feature allowing optical observation of degradation or other changes during routine, periodic service checks.

SUMMARY

An optical witness or 'tell-tale' feature is incorporated into a structural repair that allows the performance of the repair to be quickly and easy monitored. Changes in the repair, including early partial failure or degradation of a repair can be visually identified so the repair can be more frequently monitored, repaired, or replaced as needed. In one embodiment, stress sensitive fluorescent dyes are incorporated into the pigment of an appliqué placed over the repair area or in the resin of the surface or overlay ply of the repair. The optical behavior of the fluorescent dye changes as a function of a stress in the repair.

The stress sensitive fluorescent dye, which may be referred to as mechanochromatic dyes, may be designed to show changes in local strain/stress patterns, so that when they are subjected to electromagnetic energy of a particular wavelength, such as UV, IR, or visual light, they fluoresce more (or less) strongly. When the bond in a repair begins to degrade, the adhesive disbonds from the repaired structure causing the local strain within the patch and/or surrounding structure to change. The strain may be relatively low over the disbonded area, but may rise in other areas as the patch and/or structure attempts to carry the load. These changes will may seen by an inspection technician performing a quick visual check of the patch using an appropriate light source to fluoresce the dye in the appliqué or surface ply. If the fluorescence over an area of the patch becomes non-uniform or different from its baseline, this may be taken as an indication that the patch is beginning to degrade in that area, and should be checked with an NDE instrument or regularly monitored until it can be checked, repaired, or replaced.

The cost of incorporating a witness dye into an appliqué or in the resin of a surface ply is relatively low. The inspection/monitoring method does not require a highly trained NDE technician or expensive NDE equipment. The inspection method and optical witness may reduce or eliminate the need for complicated and expensive structural health monitoring (SHM) equipment or on-board sensors. The mechanochromatic dye may be used at a relatively low level in order to avoid significantly increasing the weight of a resin in an overlay ply. In some embodiments, when the dye is incorporated into an appliqué, the appliqué may also function as lightning strike protection, and may be selected to provide a color that matches the structure around it.

According to one disclosed embodiment, a structural repair comprises a patch adapted to be adhesively bonded to a structure requiring repair, and a layer of material covering the patch for visually indicating changes in the repair. The layer of material may include a composite ply overlying and cocured with the patch, wherein the composite ply contains a mechanochromatic dye. The mechanochromatic dye fluoresces when subjected to electromagnetic energy in accordance with localized stresses in the repair. In another embodiment, the layer of material may include an appliqué adhered to the structure and covering the patch, wherein the appliqué contains a mechanochromatic dye having an optical characteristic that changes in accordance with localized stresses in the repair.

According to another disclosed embodiment, a method is provided of monitoring changes in a patch bonded to a structure. The method comprises applying a layer of material over the patch having an optical behavior that varies in response to changes in stress in the patch, and periodically checking the layer of material for changes in the optical behavior of the layer of material. Applying the layer of material may include adhering an appliqué to the structure overlying the patch, while in another embodiment, applying the layer of material includes placing a composite ply over the patch, and cocuring the composite ply and the patch. Periodically checking the layer of material includes subjecting the layer of material to electromagnetic energy of a preselected wavelength, and recording the optical behavior of the layer of material. Recording the optical behavior of the layer of material includes collecting photoluminescent quantum yield and fluorescence emission spectra from the layer of material. Periodically checking the layer of material may further include marking an area of the structure containing the patch when the optical behavior indicates a change in the stress in the patch, and performing further non-destructive evaluation of the patch.

According to still another embodiment, a method is provided of repairing an area of an aircraft component. The method comprises placing a patch over the area; bonding the patch to the aircraft component; placing a layer of material over the patch having an optical behavior that varies in response to changes in stress in the patch; recording a baseline image representing the optical behavior of the layer of material at a time that the patch is bonded to the aircraft component; and periodically checking performance of the patch by recording subsequent images representing the optical behavior of the layer of material, and comparing the subsequent images to the baseline image. Placing the layer of material may include adhering an appliqué to the aircraft component overlying the patch or placing a composite ply over the patch, and cocuring the composite ply and the patch. Recording the baseline image and recording the subsequent images each includes subjecting the layer of material to electromagnetic energy of a preselected wavelength, and collecting photoluminescent quantum yield and fluorescence emission spectra from the layer of material. Periodically checking the performance of the patch may further include marking an area of the patch when comparison of the subsequent images to subsequently recorded image with the baseline image indicates a change in the stress in the patch, and performing further non-destructive evaluation of the patch. Comparing the subsequent images to the baseline image is performed using a data processing system.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is aircraft manufacturing and service method in which an advantageous embodiment may be implemented;

FIG. 2 is aircraft in accordance with an advantageous embodiment;

FIG. 5 is an illustration of a data processing system in accordance with an advantageous embodiment;

FIG. 9 is an illustration similar to FIG. 8, showing a repair eliminating the inconsistencies;

DETAILED DESCRIPTION

Figure 3:
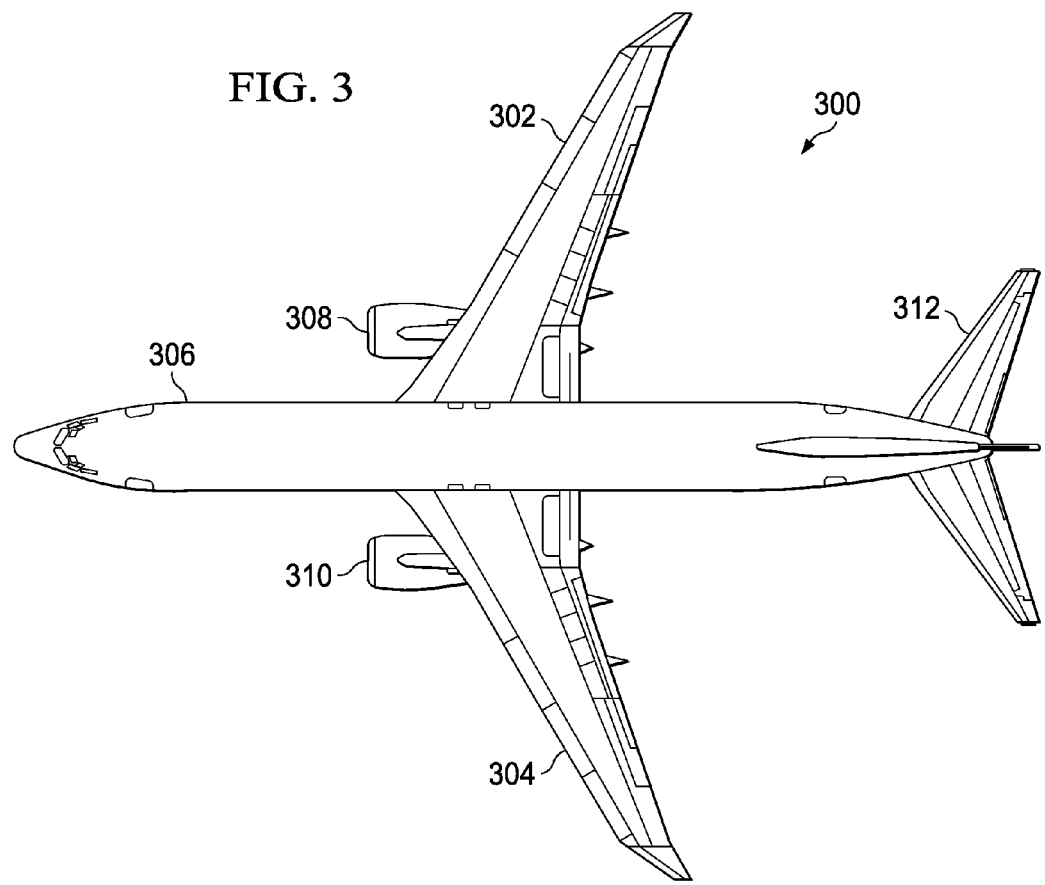
FIG. 3 is an illustration of an aircraft in accordance with an advantageous embodiment.

The disclosed embodiments relate to an optical witness or 'tell-tale' feature incorporated into a structural repair that allows the performance of the repair to be quickly and easy monitored. Changes in the repair, including early partial failure or degradation of a repair can be visually identified so the repair can be more frequently monitored, repaired, or replaced as needed. The optical witness may comprise stress sensitive fluorescent dyes incorporated into the pigment of an appliqué placed over the repair area or into the resin of the surface or overlay ply of the repair. The optical behavior of the fluorescent dye changes as a function of a stress in the repair, thereby providing a visual indication of the changes in the repair.

Referring to the drawings, embodiments of the disclosure may be described in the context of aircraft manufacturing and service method 100 as shown in FIG. 1 and aircraft 200 as shown in FIG. 2. Turning first to FIG. 1, during pre-production, aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service, including the inspection and repair of components and subassemblies.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include an airframe 202 with the plurality of systems 204 and the interior 206. Examples of the systems 204 include one or more of a propulsion system 208, an electrical system 210, a hydraulic system 212, and an environmental system 214. Any number of other systems may be included. Although an aerospace example is shown, different advantageous embodiments may be applied to other industries, such as the automotive industry.

Structural repairs and repair methods embodied herein may be employed during at least one of the stages of the aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in the component and subassembly manufacturing 106 in FIG. 1 may be fabricated or manufactured in a manner similar to components or subassemblies produced while the aircraft 200 is in service 112 in FIG. 1. As yet another example, a number of apparatus embodiments, method embodiments, or a combination thereof may be utilized during production stages, such as the component and subassembly manufacturing 106 and the system integration 108 in FIG. 1. A number, when referring to items, means one or more items. For example, a number of apparatus embodiments is one or more apparatus embodiments. The use of a number of the different advantageous embodiments may substantially expedite the assembly of and/or reduce the cost of aircraft 200. A number of apparatus embodiments, method embodiments, or a combination thereof may be utilized while the aircraft 200 is in service 112 and/or during maintenance and service 114 in FIG. 1. For example, the disclosed embodiments may be employed to repair components and subassemblies of the aircraft 200 during maintenance and service 114. Also, method embodiments disclosed herein may be employed during maintenance and service 114 to monitor the performance of previously made structural repairs.

With reference now to FIG. 3, an illustration of an aircraft 300 is depicted in which an advantageous embodiment may be implemented. Aircraft 300 is a typical example of the aircraft 200 shown in FIG. 2, in which repairs utilizing stress sensitive fluorescent coatings may be implemented. In this illustrative example, the aircraft 300 has wings 302 and 304 attached to a body 306. The aircraft 300 includes a wing mounted engine 308, a wing mounted engine 310, and a tail 312. Each of the wings 302, 304, the body 30, the wing mounted engine 308, the wing mounted engine 310, and the tail 312 may include components, such as an outer skin which may include composite patch repairs incorporating stress sensitive fluorescent coatings that allow the performance of the repairs to be monitored.

Figure 4:
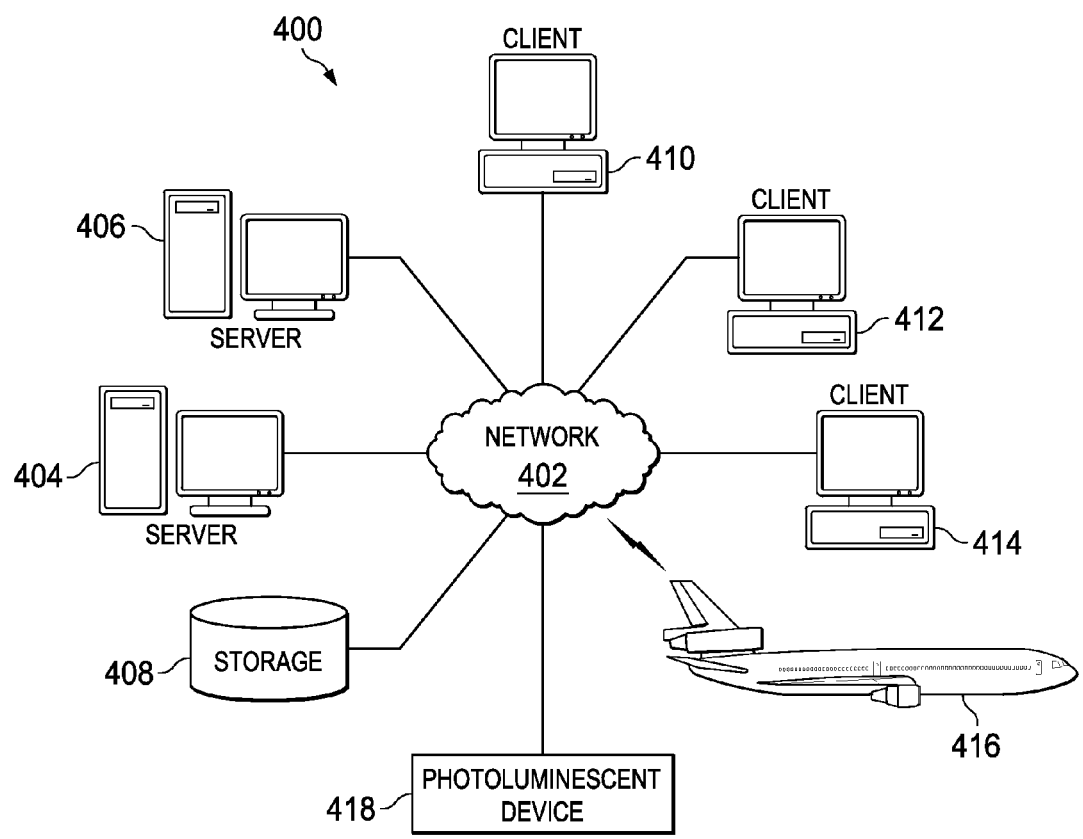
FIG. 4 is an illustration of a network of data processing systems in accordance with an advantageous embodiment.

Monitoring changes in composite patches in accordance with the disclosed embodiments may be employed to develop inspection data used to manage a maintenance program for an aircraft or a fleet of aircraft. FIG. 4 is an illustration of a network data processing system 400 in which the advantageous embodiments may be implemented as part of an aircraft maintenance program. The network data processing system 400 comprises a network 402 which is the medium used to provide communications links between various devices and computers connected together within network data processing system 400. The network 402 may include connections, such as wire, wireless communication links, or fiber optic cables. In the illustrated example, servers 404, 406 connect to the network 402 along with a storage unit 408, and clients 410, 412, and 414. These clients 410, 412, and 414 may be, for example, personal computers or network computers. In the depicted example, the server 404 provides data, such as boot files, operating system images, and applications to the clients 410, 412, and 414. The clients 410, 412, and 414 are clients to the server 404 in this example. One or more aircrafts 416 are also clients that may exchange information with clients 410, 412, and 414.

In the illustrated depicted example, a photoluminescent device 418 connects to one or more of the servers 404, 406, the clients 410, 412, 414. The photoluminescent device 418 functions to collect photoluminescent quantum yield (PLQY) and fluorescence emission spectra indicative of the performance of a composite structural repair patch. Photoluminescent device 418 can be for example, a Hamamatsu Absolute PL Quantum Yield Measurement System available from Hamamatsu K.K, US location Bridgewater, N.J. Photoluminescent device 418 can obtain fluorescence profiles of composite structural repair patches and store those fluorescence profiles on one or more of the server 404, the server 406, the client 410, the client 412, and the client 414.

FIG. 5 illustrates a data processing system 500 that may be used to implement the servers and clients shown in FIG. 4, and is typical of a system that may be found on the aircraft 416 in FIG. 4. The data processing system 500 broadly comprises a communications framework 502, processor unit 504, storage devices 506, 508, communications unit 510, input/output unit 512 and a display 514. As depicted, data processing system 500 includes communications framework 502, which provides communications between processor unit 504, storage devices 506, communications unit 508, input/output unit 510, and display 512. In some cases, communications framework 502 may be implemented as a bus system. The processor unit 504 executes instructions for software that may be loaded into the storage devices 506, 508. The communications unit 510 may provide communications through the use of either or both physical and wireless communications links. Input/output unit 512 allows for input and output of data with other devices that may be connected to the data processing system 500. The data processing system may employ one more computer programs 522 on computer readable media 520 which may include program code 518, computer readable storage media 524 and computer readable signal media 526.

As previously mentioned, the disclosed embodiments provide a structural repair whose condition or performance can be monitored by periodic visual inspection during routine service checks of the aircraft. Changes in the repair that are visually identified during these routine service checks may indicate that a repair patch should be monitored more frequently, repaired further or replaced. As will be discussed below in more detail, repairs made according to the disclosed method employ stress sensitive fluorescent dyes that are incorporated into the pigment of an appliqué placed over the repair area or into the resin of the surface or overlay ply of the repair. The optical behavior of the fluorescent dye changes as a function of a stress in the repair, thereby providing a visual indication of the changes in the repair.

Highly efficient, aggregation-sensitive dyes with intrinsic dipole moments are selected and functionalized with end groups to either promote or prevent combination with coating polymer networks. When stress is applied to the coating or layer of material over a composite repair patch, the positions of the dye molecules will shift as the polymer network displaces. The applied stress will change the dyes' aggregation behavior, and change their fluorescence behavior as a result.

The viscoelastic nature of polymer coatings and layers, and the complexity of molecular interactions make predicting the manner in which a dye will respond challenging. However, according to the solution provided by the disclosed embodiments, the manner in which the dye's fluorescence behavior changes is not important. Moreover, the disclosed dyes used to monitor changes in a structural repair are not dependent on the presence of a particular type of stress—the dye is sensitive to both tensile and compressive stresses in a repair patch caused by patch degradation, disbonding or other factors. Changes in fluorescent wavelength emission, either toward monomer-like behavior or dimer-like behavior, or changes in emission intensity due to quenching or aggregation-induced emission, are all detectable. By comparing an initial stress profile of aircraft coatings or layers incorporating the dyes to subsequent stress profiles, stress changes in a structural repair patch can be detected.

Figure 6:
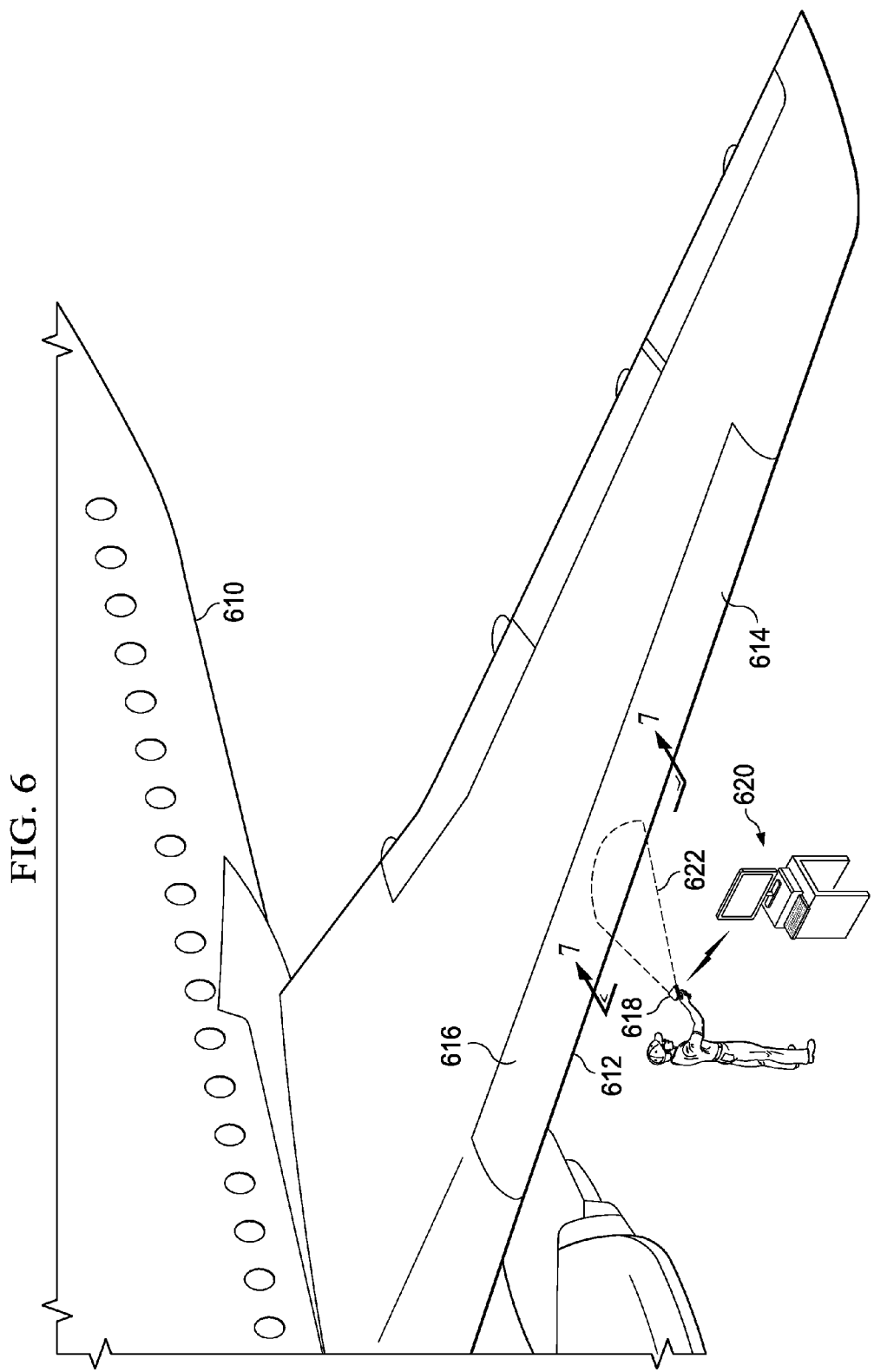
FIG. 6 is a system for determining stress inconsistencies in an aircraft coating in accordance with an advantageous embodiment.

FIG. 6 illustrates a system used to carry out a method for monitoring changes in a composite patch used to repair a component 612 of the an aircraft 610 which may be similar to that previously described in connection with FIG. 3. Component 612 may comprise, for example, a composite outer skin. A stress sensitive fluorescent coating 614 is placed over areas of the component 612 that contains structural repairs. As will be discussed later in more detail, the repair may include a composite laminate patch, and the coating 614 may be in the form of an appliqué or a layer that overlies the composite patch. The condition of the repair may be monitored by determining stress inconsistencies in the coating 614 covering the repair. The stress inconsistencies may result from, for example, degradation, delamination or disbonding of the repair patch from the aircraft component 610.

The stress sensitive fluorescent coating 614 includes fluorescent dye molecules 616 whose fluorescent behaviors change in response to external stress or deformation stimuli. The fluorescent dye molecules 616 display a behavior that depends on their concentration within the local environment. If two dye molecules are in very close proximity to one another, they may share the energy of an absorbed photon between them by merging their electron density to form a dimer complex. The dimer complex absorbs and emits photons at differing wavelengths and with different efficiency than the single molecule or monomer. This phenomenon may also be referred to as aggregation.

The induced fluorescence of the fluorescent dye molecules 616 changes with deformation of the component 612 in the area of the repair. As the local environment of the fluorescent dye molecules 616 is deformed, the proximity of dye molecules to one another is changed, either increased or decreased depending on, for example, the molecular mobility of the fluorescent dye molecules 616. The probability of the fluorescent dye molecules 616 to form aggregates is then also changed, and as a result the fluorescence behavior of the fluorescent dye molecules 616 is changed as well.

In an advantageous embodiment, the fluorescent dye molecules 616 with intrinsic dipole moments are selected and incorporated into the stress sensitive fluorescent coating 614. When stress is applied to the stress sensitive fluorescent coating 614, which may be caused by degradation, delamination or disbonding of the repair patch beneath the coating 614, the positions of the fluorescent dye molecules 616 shift as the polymer network displaces. This shift changes the aggregation behavior of the fluorescent dye molecules 616, and therefore also the fluorescence behavior as a result.

In one advantageous embodiment, the fluorescent dye molecules 616 are based on a modified stilbene-type fluorescent molecule customized with differing end groups designed to control their solubility and interaction with the polymer coating components of the stress sensitive fluorescent coating 614. The modified stilbene-type fluorescent molecule exhibits a large amount of conjugation that allows its electron density to move both within the molecule, for monomer-type excitation, and out-of-plane when in proximity with another stilbene, for dimer excitation The data processing system 620 can be, for example, one or more of the server 404, the server 406, the client 410, the client 412, and the client 414 of FIG. 4.

Figure 7:
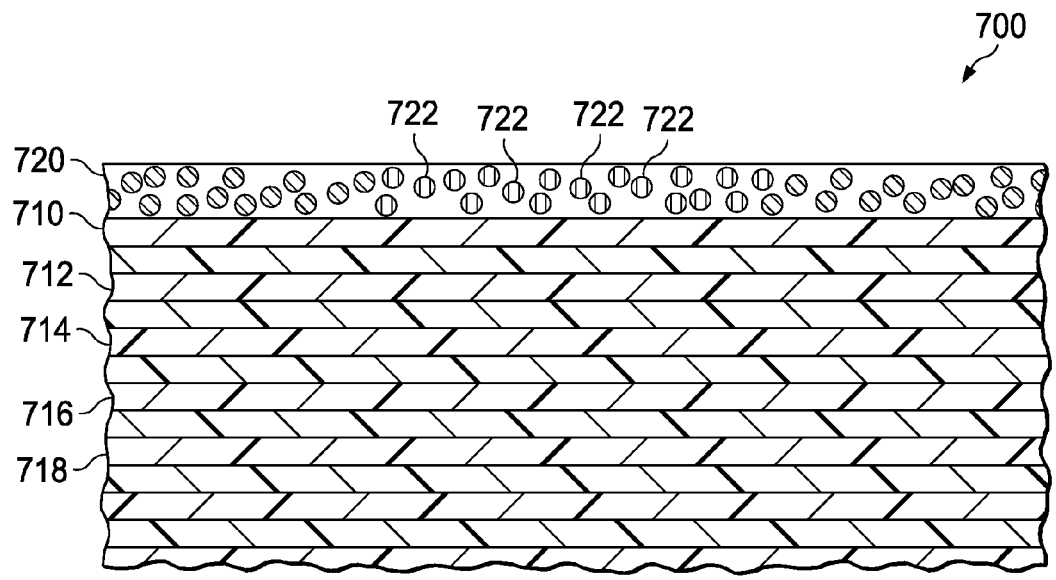
FIG. 7 is a cross section of a composite component in accordance with an advantageous embodiment.

Referring now to FIG. 7, a cross section of a composite component is shown according to an advantageous embodiment. The composite component 700 can be a component such as an aircraft outer skin. The composite component 700 may include layers 710-718 which form laminated plies. Each of the layers 710-718 may comprise a fibrous reinforcement that has been impregnated with a polymeric resin. Layers 710-718 are laminated together to form a substantially consolidated structure.

In one embodiment, a stress sensitive fluorescent coating 720 is applied to the composite component 700, and may comprise the stress sensitive fluorescent coating 614 shown in FIG. 6. The stress sensitive coating 720 may comprise a topcoat of paint or other material and/or an underlying primer coat that incorporates the fluorescent dye molecules 722. In some embodiments, the topcoat to which the stress sensitive coating 720 is applied may be a clearcoat substantially devoid of pigmentation. In still other embodiments, the fluorescent dye molecules 722 may be incorporated into the first layer (ply) 710 of resin during fabrication of the composite component 700. In still other embodiments, as will be discussed in more detail below, the stress sensitive coating 720 may comprise an appliqué or a layer of composite material covering a repair in the composite component 700.

The stress sensitive fluorescent coating 720 exhibits a stress profile based on the local environment of the fluorescent dye molecules 722. The fluorescent dye molecules 722 that are in a particular proximity to others of the fluorescent dye molecules 722 due to stress of the stress sensitive fluorescent coating 720 will exhibit fluorescence that is different than the fluorescent dye molecules 722 that are in a different proximity to others of the fluorescent dye molecules 722. In those applications where the fluorescent dye molecules 722 are incorporated into the first layer 710 of the component 700, the response of the coating 720 may be obscured by any overlying topcoat or primer coat that may be applied to the component 700. However, prior to the application of any topcoat and/or primer coat, such as during an intermediate stage of manufacturing or before the component 700 is placed in service, the reaction of the fluorescent dye molecules 722 in the first layer 710 may reveal damage or other phenomena that cause stress concentrations on the component 700.

Figure 8:
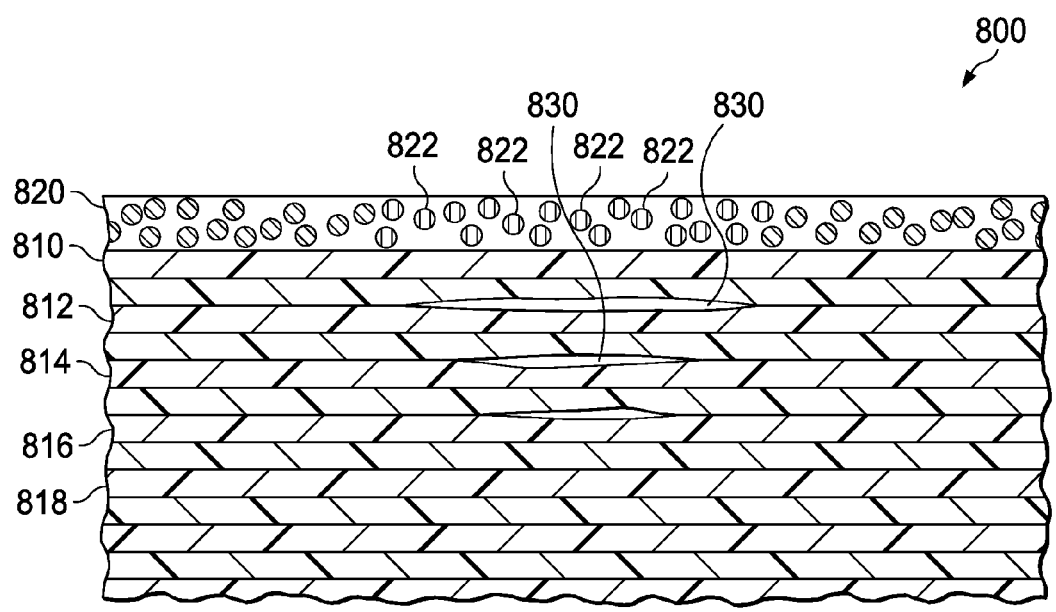
FIG. 8 is a cross section of a composite component having inconsistencies therein.

Referring now to FIG. 8, a cross section of a composite component 800 that has experienced an event causing an inconsistency that may be invisible or barely visible to a visual inspection, is shown according to an advantageous embodiment. The inconsistency may be in an area of the component 800 that contains a repair. The composite component 800 includes a plurality of laminated layers 810-818 of fiberous reinforcement impregnated with a polymeric resin. The stress sensitive fluorescent coating 820 may be applied to the surface of the composite component 800. The stress sensitive fluorescent coating 820 is the stress sensitive fluorescent coating 614 of FIG. 6. The composite component 800 includes inconsistencies 830 that may be invisible or barely visible to a visual inspection. The inconsistencies 830 may include, for example, delaminations of one or more of the layers 810-818, undesired conditions in resins of the composite component 800, and/or undesired conditions in fiber reinforcement of the composite component 800. In the case of a repair made to the composite component 800, the inconsistency 830 may comprise, for example, delamination within a laminated composite repair patch, disbonding or degradation of the patch or other changes in the repair that may affect the performance of the component 800.

Events resulting in the inconsistencies 830 cause changes in a stress profile of the stress sensitive fluorescent coating 820. Changes in the stress profile may also be detected which are indicative of an inconsistency caused by any of a variety of events, including but not limited to ply delamination within a repair patch, disbonding or degradation of the patch or impact damage to the patch. The induced fluorescence of the fluorescent dye molecules 616 therefore also changes stress profile of the stress sensitive fluorescent coating 820. As the local environment of the fluorescent dye molecules 822 is deformed, the proximity of dye molecules to one another is changed, either increasing or decreasing depending on, for example, the molecular mobility of the fluorescent dye molecules 616. The probability of the fluorescent dye molecules 616 to form aggregates is then also changed, and as a result, the fluorescence behavior of the fluorescent dye molecules 616 is changed as well.

The viscoelastic nature of the stress sensitive fluorescent coating 820 and the complexity of molecular interactions of the fluorescent dye molecules 822 make predicting the manner in which a dye will respond difficult. However, changes in fluorescent wavelength emission, either toward monomer-like behavior or dimer-like behavior, or changes in emission intensity due to quenching or aggregation-induced emission, are all detectable. By comparing an initial stress profile of the stress sensitive fluorescent coating 720 of FIG. 7 to the subsequent stress sensitive fluorescent coating 820, stress changes due to the presence of inconsistencies in a component 800, including repairs made to the component 800 can be determined.

Figure 9A:
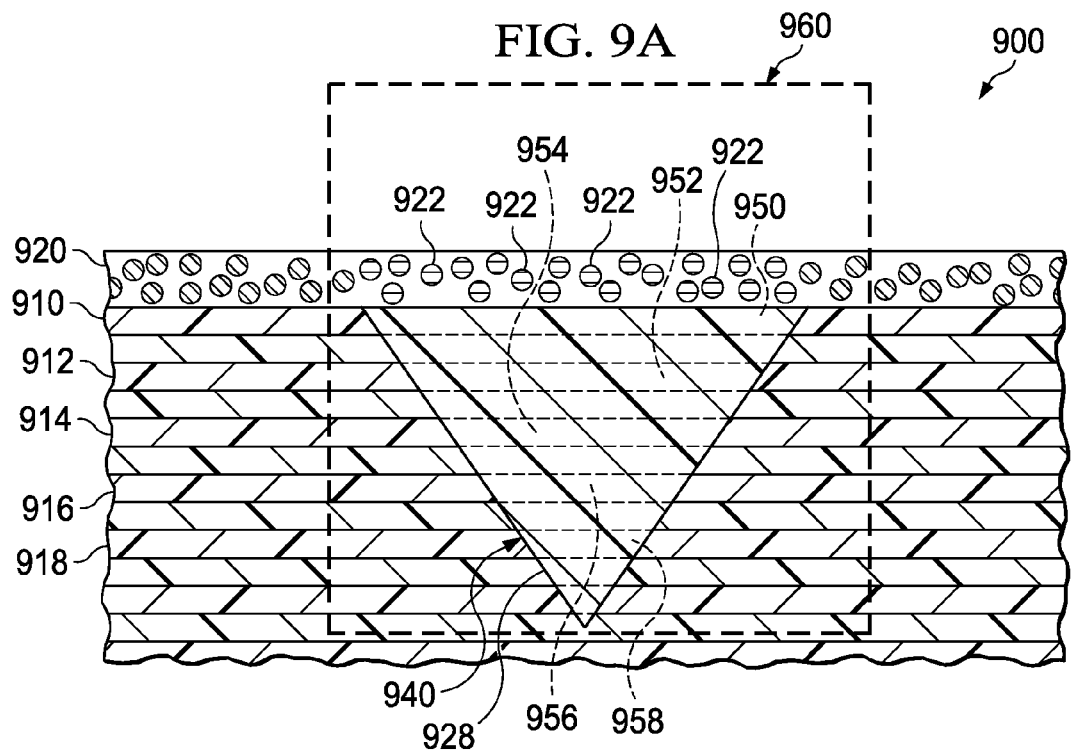
FIGS. 9A-9F are perspective views of a portion of an aircraft skin showing the successive steps of a method of repairing inconsistencies in the skin and inspecting the repair.

Referring now to FIG. 9A, the disclosed stress sensitive fluorescent coating 920 may be employed to monitor changes in a repair or rework area 960 within a component 900 which may comprise, for example and without limitation, a composite skin 900. The stress sensitive fluorescent coating 920 exhibits a stress profile based on the local environment of the fluorescent dye molecules 922. FIG. 9A illustrates a cross section of the skin 900 after having undergone a process to repair one or more inconsistencies caused for example, by an impact. The repair area 960 comprises a scarf 940 in the skin 900 that is covered and filled with an adhesively bonded repair patch 928. The repair patch 928 includes laminated composite plies 950-958 which may be aligned with the layers 910-918 of the skin 900. In this example, the stress sensitive fluorescent coating 920 is applied to the surface of the skin 900, overlying the repair patch 928. The stress sensitive fluorescent coating 920 may be incorporated into a topcoat paint or primer that is applied over the entire area of the skin 900, as during repainting of the aircraft 300 (FIG. 3), or only over a portion of the area of the skin 900. The stress profile for the skin 900, including that of the repair area 960, may be different respectively before and after changes that may occur in the repair area 960, including the repair patch 928. These changes may represent inconsistencies in the repair area 960 resulting from one or more events, conditions or phenomena, including but not limited to impact damage to the repair patch 928, or delamination disbonding or degradation of the repair patch 928. Therefore, after performing a repair or other rework operation, a new stress profile is obtained for the composite skin 900. The new stress profile can then be input and stored in a data processing system, such as the data processing system 620 of FIG. 6, for use in subsequent inspection and servicing of the aircraft 300, and monitoring of the condition of the repair patch 928.

Figure 9B:
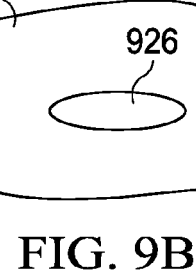
Figure 9C:
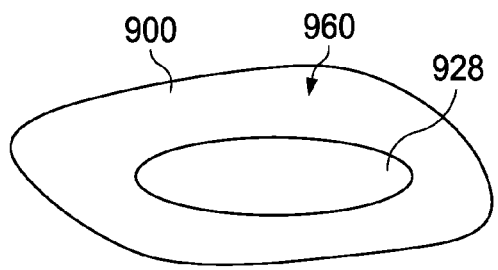
Figure 9D:
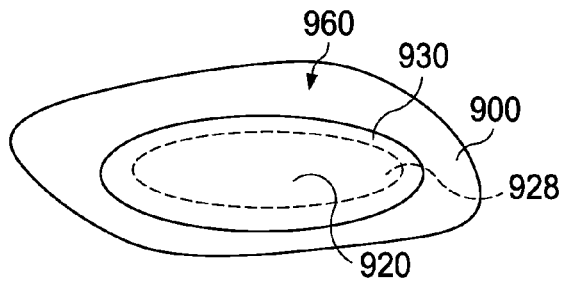

FIGS. 9B-9F illustrate another method of repairing or reworking a composite component using the disclosed stress sensitive fluorescent coating 920. As shown in FIG. 9B, a composite component, which in the illustrated example comprises an aircraft skin 900, has inconsistencies 926 such as, for example, impact damage that may or may not be visible. The inconsistencies 926 may be removed in a repair area 960 using a scarfing technique similar to that previously described in connection with FIG. 9A. Referring to FIG. 9C, a composite patch 928 is adhesively bonded to the skin 900 in the repair area 960 containing the inconsistencies 926. The composite patch 928 may comprise, for example, multiple laminated plies of composite material such as fiber reinforced resin. Next, as shown in FIG. 9D, an overlay layer 930 of material is placed over the composite patch 928. The overlay layer 930 of material contains a mechanochomatic or stress sensitive fluorescent dye of the type previously discussed in connection with FIGS. 7 and 8 which includes stress sensitive fluorescent dye molecules. The mechanochromatic dyes may be designed to show changes in local strain/stress patterns, so that when they are subjected to electromagnetic energy of a particular wavelength, such as UV, IR, or visual light, they fluoresce more (or less) strongly as a function of the local stress/strain.

In one embodiment, the overlay layer 930 may comprise an overlay ply of composite material such as fiber reinforced resin that is cocured with the composite patch 928. In other embodiments, the overlay layer 930 of material may comprise an appliqué 952 (See FIGS. 9G and 9H) that is pressed into place on the skin 900 over the patch 928 in the repair area 960. The appliqué 952 may comprise a polymeric film or other suitable material which contains the mechanochomatic dye and is adhered to the skin 900. The mechanochromatic dye may be used at a relatively low level in order to avoid significantly increasing the weight of a resin in an overlay ply. In some embodiments, when the dye is incorporated into an appliqué 952, the appliqué 952 may also function as lightning strike protection, and may be selected to provide a color that matches the structure (e.g. skin 900) around it. The mechanochomatic dye may be tailored to respond to specific type of repair degradations.

Figure 9E:
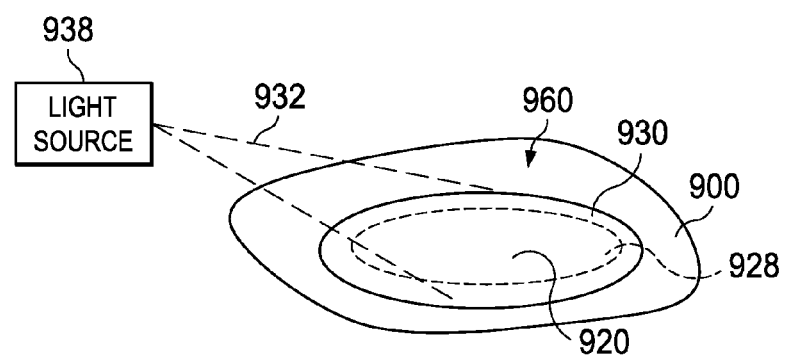

FIG. 9E illustrates the next step in the repair/rework method, in which electromagnetic radiation 932 of a suitable wavelength generated from a photoluminescent device, which may comprise a suitable light source 938, is directed onto the repair patch 928. The wavelength of the light 932 may be, for example, in the UV (ultraviolet) range, depending on the particular mechanochomatic dye contained in the overlay layer 930 of material that overlies the composite patch 928. Illumination of the composite patch 928 with the radiation 932 produces a baseline strain image or stress profile that essentially comprises a mapping of specific fluorescence of components of the mechanochomatic dye. This process of producing a strain image is essentially the same as that previously described in connection with FIG. 6 in which a photoluminescent device 618 is used to collect Photoluminescent quantum yield (PLQY) and fluorescence emission spectra. In FIG. 6, photoluminescent device 618 may generate electromagnetic radiation 622. The baseline strain image may be stored in the data processing system 400, 500 shown in FIGS. 4 and 5 respectively, for future use in servicing and monitoring the health of the aircraft 300 shown in FIG. 3. During periodic checks to monitor the performance of the repair patch 928, subsequent strain images are recorded which are compared with the baseline strain image using the data processing system 400, 500.

The initial baseline strain image may directly reveal, for example, areas of the composite patch 928 that are inadequately bonded to the skin 900. When the bond in a repair begins to degrade, the adhesive disbonds from the repaired structure, causing the local strain within the patch 928 and/or surrounding structure to change. The strain may be relatively low over the disbonded area, but may rise in other areas as the patch 928 and/or structure attempts to carry the load. These changes may seen by an inspection technician performing a quick visual check of the patch 928 using an appropriate light source to fluoresce the dye in the appliqué or surface ply. If the fluorescence over an area of the patch 928 becomes non-uniform or different from its baseline, this may be taken as an indication that the patch 928 is beginning to degrade in that area, and may be checked with an NDE instrument or regularly monitored until it can be checked, repaired, or replaced. Any areas of the composite patch 928 revealed to possibly have inadequate bonding may further evaluated using any of several known NDE (non-destructive evaluation) techniques.

Figure 9F:
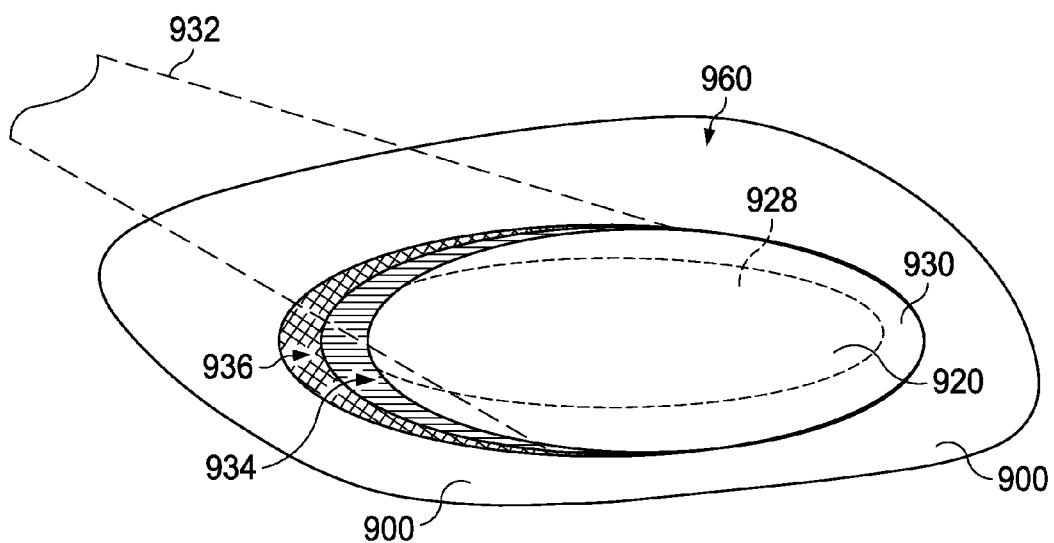

Referring now to FIG. 9F, the repair patch 928 may be quickly and easily periodically checked by service personnel for undesirable changes during routine servicing of the aircraft 300. A typical repair check comprises directing UV light 932 onto the repair area 960 and comparing the resulting fluorescence with the stored baseline strain image, using the data processing system 400, 500 (FIGS. 4 and 5). Areas 934 exhibiting an increase in fluorescence may indicate an increase in the stress/strain as the load path through the repair area 960 shifts, while areas 936 that exhibit a decrease in fluorescence may indicate a reduction of load carrying ability of the patch 928 at the edges of the patch 928. It should be note here that while the exemplary embodiments illustrate the use of the repair and monitoring method in connection with the repair of a composite structure, the embodiments may also be used in the repair of other types of structures, such as without limitation, aluminum and titanium structures employing bonded patches.

Figure 9G:
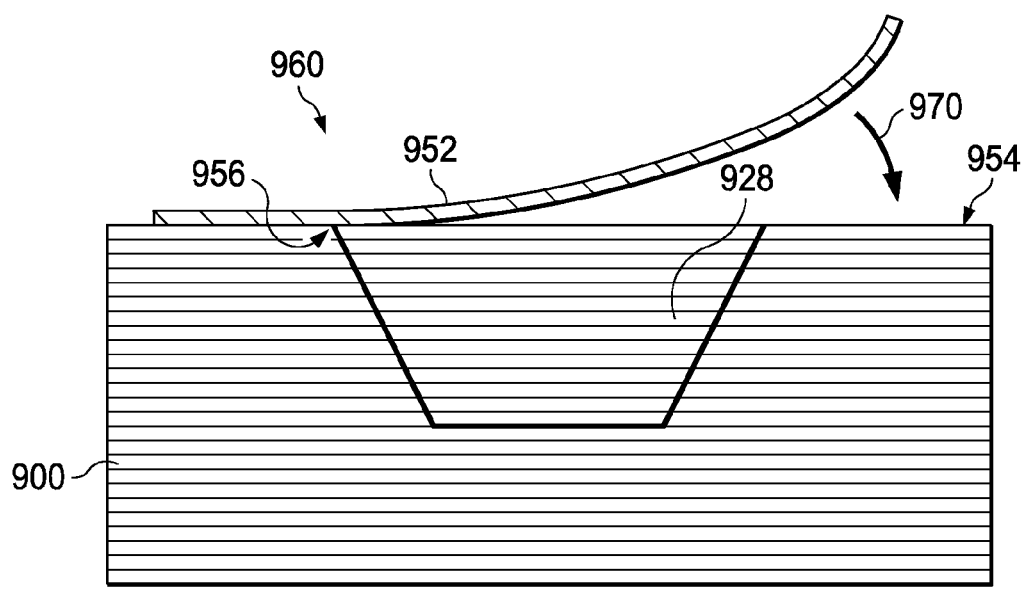
FIG. 9G is a cross sectional view of an aircraft skin, showing an optical witness appliqué in the process of being placed over a repair patch in the skin.
Figure 9H:
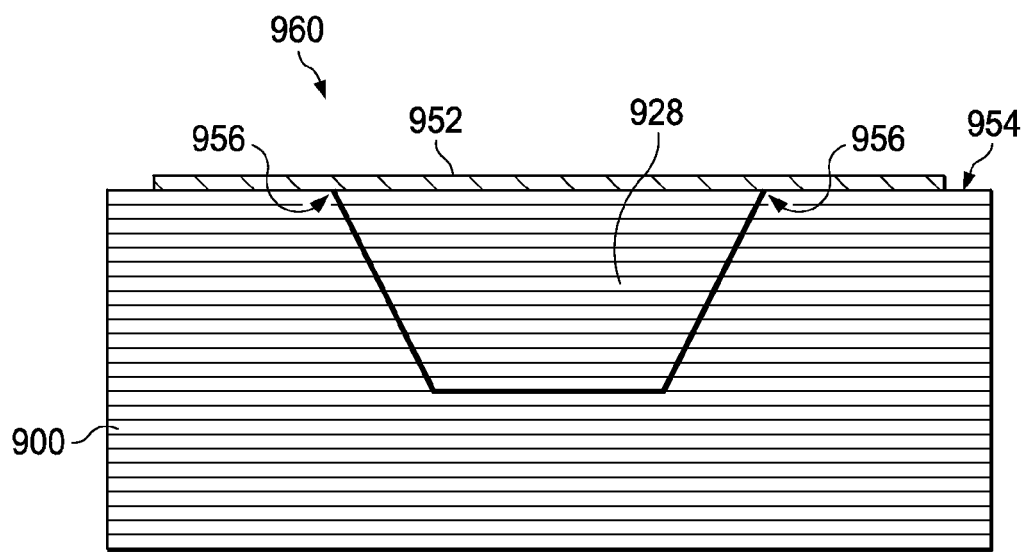
FIG. 9H is a cross sectional view similar to FIG. 9G but showing the appliqué having been applied flush on the skin covering the repair patch.

FIG. 9G illustrates an optical witness appliqué 952 being placed on the surface 954 of a skin 900. The appliqué 952 may comprise, for example, a flexible sheet-like material that may be bonded to the skin surface 954 using a suitable adhesive. Alternatively, the appliqué 952 may itself comprise a sheet of adhesive that incorporates the stress sensitive fluorescent dyes therein. FIG. 9H shows the appliqué 952 adhered and lying flush on the skin surface 954. The appliqué 952 has an area that is at least sufficient to cover the entire area of the patch 928, but preferably extends beyond the outer margins 956 of the patch 928.

Figure 9I:
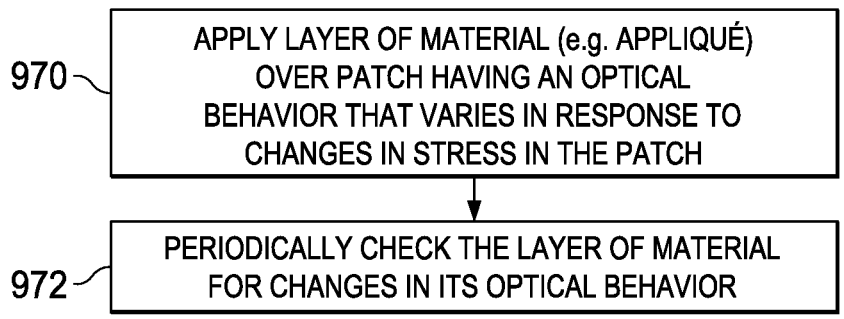
FIG. 9I is a flowchart of a method of monitoring changes in a composite patch bonded to a structure.

FIG. 9I broadly illustrates the steps of a method of monitoring changes in a composite patch 928 bonded to a structure, such as an aircraft skin 900, as discussed above. At step 970, a layer of material 930 is applied over the patch 928. The layer of material 930 has an optical behavior that varies in response to changes in stress in the patch 928. At step 972, the layer of material 930 is periodically checked for changes in its optical behavior. As previously mentioned, changes in the optical behavior of the layer of material 930 may indicate changes in the condition or performance of the patch 928.

Figure 9J:
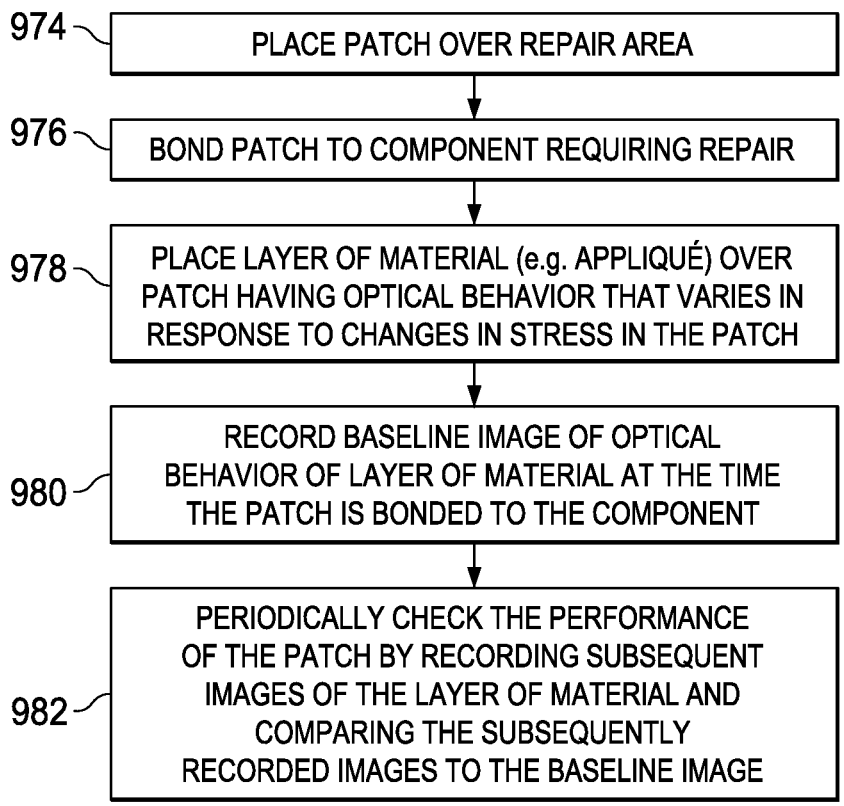
FIG. 9J is a flowchart of a method of repairing an area of an aircraft component.

FIG. 9J broadly illustrates the steps of a method of repairing an area 960 of an aircraft component 900, which may comprise an aircraft skin 900. Beginning at 974, a patch 928 is placed over the repair area 960 on the component 900, following which, at 976, the patch 928 is bonded to the component 900. At step 978, a layer of material 930 is placed over the patch 928. The layer of material 930 has an optical behavior that varies in response to changes in the stress in the patch 928. At 980, a baseline image of the optical behavior of the layer of material 930 is recorded at the time that the patch 928 is bonded to the component 900. At step 982, the performance of the patch 928 is periodically checked by recording subsequent images of the layer of material 930 and comparing the subsequently recorded images with the baseline image.

Figure 10:
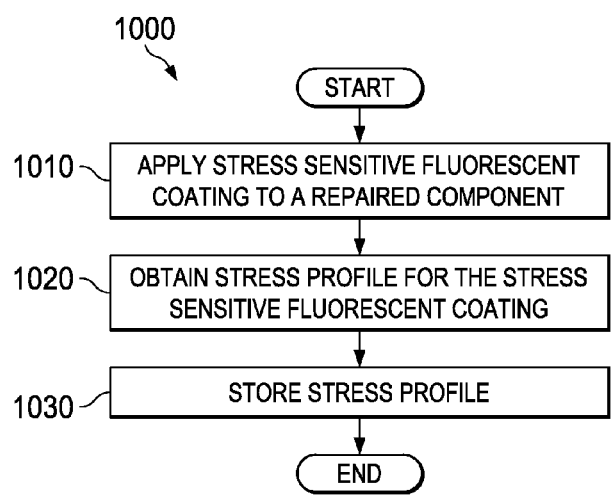
FIG. 10 is flowchart for applying a stress sensitive fluorescent coating in accordance with an advantageous embodiment.

Referring now to FIG. 10, a flowchart for a process 1000 for applying a stress sensitive fluorescent coating is shown according to an advantageous embodiment. The stress sensitive fluorescent coating can be, for example, the stress sensitive fluorescent coating 614 of FIG. 6. Process 1000 begins at 1010 with the application of the stress sensitive fluorescent coating to a repaired component. The repaired component can be a component or subassemblies produced in component and subassembly manufacturing 106 processes shown in FIG. 1, including repairs made to the component or subassemblies. The stress sensitive fluorescent coating applied at step 1010 may be, for example, the stress sensitive fluorescent coating 614 of FIG. 6. The stress sensitive fluorescent coating includes the fluorescent dye molecules 616 whose fluorescent behaviors change in response to external stress or deformation stimuli. The stress sensitive fluorescent coating may include a compatible primer, and a protective topcoat, or a layer of composite material or an appliqué installed over a repair. At step 1020, an initial stress profile for the stress sensitive fluorescent coating is obtained using suitable equipment, such as the photoluminescent device 418 of FIG. 4. The stress profile essentially comprises a mapping of specific fluorescence of components to areas of that component exhibiting the fluorescence. At step 1030 the stress profile is stored in a data processing system, such as the data processing system 620 of FIG. 6.

Figure 11:
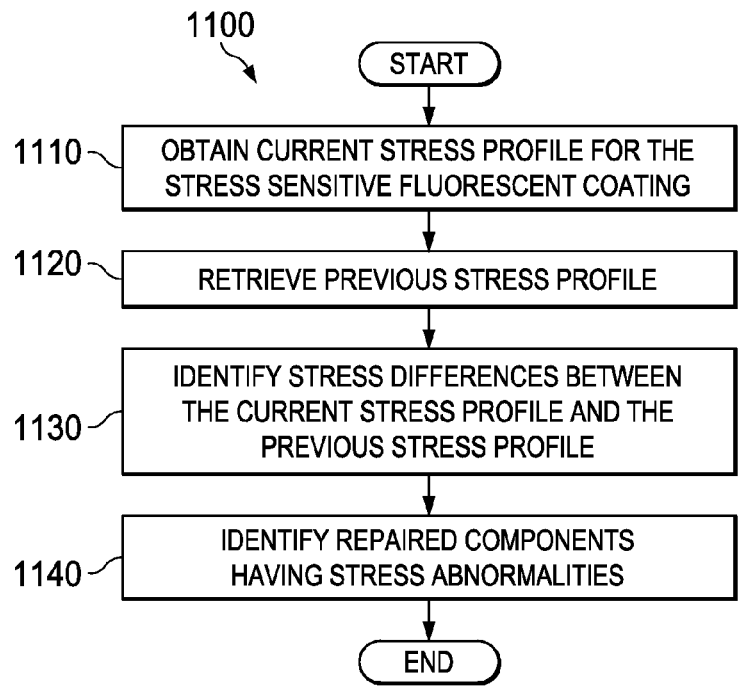
FIG. 11 is a flowchart of a process for determining stress inconsistencies in accordance with an advantageous embodiment.

Attention is now directed to FIG. 11, which illustrates a flowchart of a process for determining stress inconsistencies, according to an advantageous embodiment. The process 1100 begins at 1110 by obtaining a current stress profile for the stress sensitive fluorescent coating. The current stress profile can be obtained using a photoluminescent device such as the photoluminescent device 418 of FIG. 4. The stress profile constitutes a map of specific fluorescence of components to areas of a repaired component exhibiting the fluorescence. Based on the current stress profile obtained in step 1110, a previously obtained stress profile is retrieved at step 1120. The previous stress profile can be, for example, the initial stress profile obtained in step 1020 of FIG. 10. The previous stress profile can be obtained from an attached data processing system, such as the data processing system 620 of FIG. 6. Based on the previous stress profile retrieved at step 1120, stress differences between the current stress profile and the previous stress profile are identified at step 1130. Although not shown in FIGS. 10 and 11, a similar method may be employed to detect stress differences indicative of inconsistencies when the stress sensitive fluorescent dyes are incorporated into the top layer (ply) of a repaired composite structure or a repair patch 928, as previously discussed. It should be noted here that while the method described above in connection with FIG. 11 relies on stress differences to indicate possible inconsistencies, such inconsistencies may be indicated directly by an obtained stress profile, without the need for referencing a previously obtained "baseline" stress profile.

As previously discussed, changes in fluorescent wavelength emission, either toward monomer-like behavior or dimer-like behavior, or changes in emission intensity due to quenching or aggregation-induced emission, are all detectable. By comparing an initial stress profile of aircraft coatings to subsequent stress profiles, stress changes due to inconsistencies in a repaired component can be determined. Based on any identified stress differences, repaired components having stress inconsistencies corresponding to stress abnormalities may be identified at step 1140. It should be noted here that it may be possible to tailor the stress sensitive dyes to respond to preselected levels of stress, and to respond in various ways. For example, the dyes may be tailored to turn off, turn on or change color response when a preselected level of stress is induced in the stress sensitive fluorescent coating.

Figure 12:
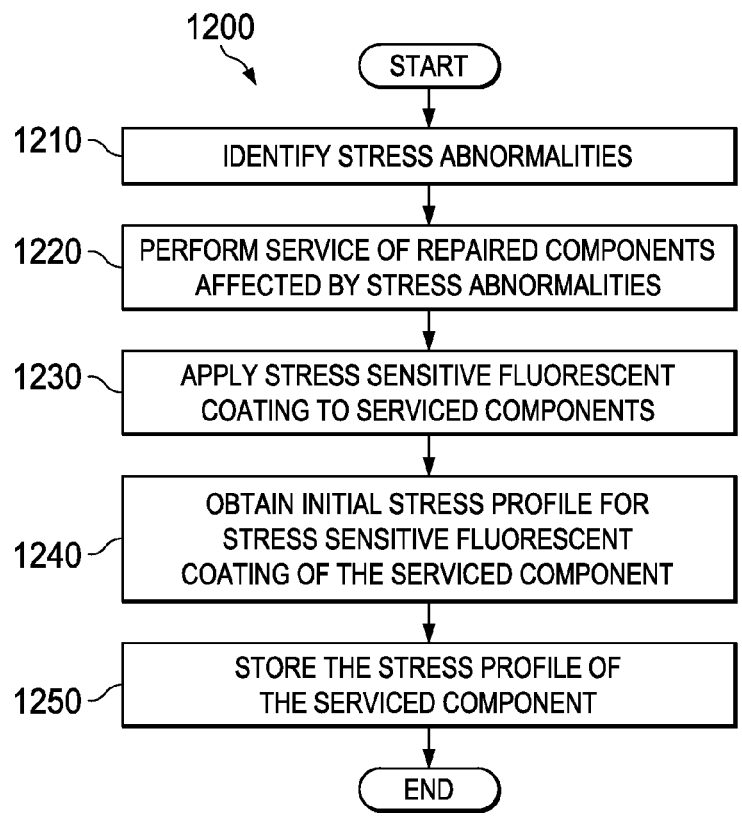
FIG. 12 is a flowchart for servicing a component having an inconsistent stress profile in accordance with an advantageous embodiment.

FIG. 12 is a flowchart of a method for servicing a repaired component having an inconsistent stress profile, according to another embodiment. An inconsistent stress profile is a stress profile that differs from an initial stress profile, and therefore indicates the presence of inconsistencies that may be invisible or barely visible to a visual inspection. The method comprises a process 1200 that begins at step 1210 by identifying stress inconsistencies in a repaired component. The stress inconsistencies can be identified using a process such as process 1100 shown in FIG. 11. Based on the stress inconsistency identified in step 1210, any components affected by the stress inconsistency identified in step 1210 are serviced at step 1220. This service may include, for example, application of a scarf or a composite patch 928 to the affected component, similar to the scarf 940 shown in FIG. 9. At step 1230, a stress sensitive fluorescent coating is applied to the component serviced in step 1220. The stress sensitive fluorescent coating can be, for example, the stress sensitive fluorescent coating 614 of FIG. 6. In the case of a repair patch 928, the stress sensitive fluorescent coating 614 may be incorporated into a composite ply overlying the repair patch 928, or into an appliqué placed over the repair patch 928. The stress sensitive fluorescent coating includes the fluorescent dye molecules 616 whose fluorescent behaviors change in response to external stress or deformation stimuli, such as that caused by an impact event, or disbonding, delamination or degradation of a composite repair patch 928. The stress sensitive fluorescent coating can include a compatible primer, and a protective topcoat.

Next, at step 1240, an initial stress profile is obtained for the stress sensitive fluorescent coating of the serviced component. The initial stress profile can be obtained using a photoluminescent device such as the photoluminescent device 418 of FIG. 4. The stress profile, which comprises a map of specific fluorescence of the serviced areas, is stored at step 1250 in a data processing system, such as the data processing system 620 of FIG. 6.

Example 1

A coating system of an epoxy based primer and a polyurethane (PU) topcoat was prepared on a 0.1 millimeter polyethylene terephthalate substrate. DESOPRIME 7501, available from PPG Aerospace, Pittsburgh, Pa., was selected as the epoxy-based primer. DESOPRIME 7501 comprises a curing agent and epoxy monomers. The curing agent is a mixture of paint solids, n-butyl alcohol, and aliphatic amines. The epoxy monomer comprises bisphenyl A and Epichlorohydrin-based resin in an acetone solvent.

A modified stilbene-type fluorescent dye was synthesized and prepared as a dry powder. The modified stilbene-type molecules were prepared having tert-butyl dimethyl silane end groups. The selected end groups were selected to be non-reactive with other components of the epoxy-based primer. The modified stilbene-type fluorescent dye was added to the epoxy monomer in an amount of $8.2*10^{-4}$ mol/L of epoxy monomer solution, which was measured using a conventional fluorescence probe (probe 6 shown in FIG. 13).

The epoxy-based primer was prepared in a 1:1 mix ratio, by volume, of curing agent to epoxy monomers. The epoxy-based primer was then applied to the polyethylene terephthalate substrate at a thickness of 20-30 micrometers. The epoxy-based primer was then allowed to cure at room temperature over a period of 48 hours.

DESOTHANE8800, available from PPG Aerospace, Pittsburgh, Pa., was selected as the polyurethane topcoat. DESOTHANE 8800 comprises a base component, and activator component, and a thinner component. The base component comprises 2-oxypanone, polymer with 2,2-bis(hydroxymethyl)-1,3-propanediol, methyl amyl ketone, and styrene acrylic polymer. The activator comprises a homopolymer of hexamethylene diisocyanate. The thinner component comprises methyl amyl ketone, and ethyl acetate.

The polyurethane topcoat was prepared in a 2:1:1 mix ratio, by volume, of base component to activator component, to thinner. The polyurethane topcoat was then applied to the epoxy-based primer at a thickness of 50-75 micrometers. The polyurethane topcoat was then allowed to cure at room temperature over a period of 48 hours.

Example 2

A coating system of an epoxy based primer and a polyurethane topcoat was prepared on a 0.1 millimeter polyethylene terephthalate substrate. DESOPRIME 7501, available from PPG Aerospace, Pittsburgh, Pa., was selected as the epoxy-based primer. DESOPRIME 7501 comprises a curing agent and epoxy monomers. The curing agent is a mixture of paint solids, n-butyl alcohol, and aliphatic amines. The epoxy monomer comprises bisphenyl A and Epichlorohydrin-based resin in an acetone solvent.

A modified stilbene-type fluorescent dye was synthesized and prepared as a dry powder. The modified stilbene-type molecules were prepared having hydroxyl end groups. The selected end groups were selected to be reactive with other components of the epoxy-based primer, and become part of the thermoset network formed as the epoxy cures. The modified stilbene-type fluorescent dye was added to the epoxy monomer in an amount of 1.28*10^-3 mol/L of epoxy monomer solution, which was measured using a conventional fluorescence probe (probe 7 shown in FIG. 13).

The epoxy-based primer was prepared in a 1:1 mix ratio, by volume, of curing agent to epoxy monomers. The epoxy-based primer was then applied to the polyethylene terephthalate substrate at a thickness of 20-30 micrometers. The epoxy-based primer was then allowed to cure at room temperature over a period of 48 hours.

DESOTHANE 8800, available from PPG Aerospace, Pittsburgh, Pa., was selected as the polyurethane topcoat. DESOTHANE 8800 comprises a base component, and activator component, and a thinner component. The base component comprises 2-oxypanone, polymer with 2,2-bis(hydroxymethyl)-1,3-propanediol, methyl amyl ketone, and styrene acrylic polymer. The activator comprises a homopolymer of hexamethylene diisocyanate. The thinner component comprises methyl amyl ketone, and ethyl acetate.

The polyurethane topcoat was prepared in a 2:1:1 mix ratio, by volume, of base component to activator component, to thinner. The polyurethane topcoat was then applied to the epoxy-based primer at a thickness of 50-75 micrometers. The polyurethane topcoat was then allowed to cure at room temperature over a period of 48 hours.

After mixing the polyurethane and epoxy coatings, liquid samples were measured for cure characteristics in Differential Scanning calorimetry (DSC) using a Netzsch DSC-200 with a Netzsch TASC 414/3 controller (Netzsch Instruments, Burlington, Mass.). Samples were heated in aluminum DSC crucibles at 2° C. per minute from 30° C. to 200° C. Cured solid epoxy and polyurethane samples were also tested using the same program to measure any residual or incomplete cure behavior.

Cured epoxy films, both with and without dyes, exhibit none of these behaviors, showing smooth curves with no exothermic or endothermic events. Therefore, the present example does not interfere with the completion of cure or solvent evaporation in the epoxy primer coating at these concentrations.

Example 3

A coating system of an epoxy based primer and a polyurethane topcoat was prepared on a 0.1 millimeter polyethylene terephthalate substrate. DESOPRIME 7501, available from PPG Aerospace, Pittsburgh, Pa., was selected as the epoxy-based primer. DESOPRIME 7501 comprises a curing agent and epoxy monomers. The curing agent is a mixture of paint solids, n-butyl alcohol, and aliphatic amines. The epoxy monomer comprises bisphenyl A and Epichlorohydrin-based resin in an acetone solvent.

The epoxy-based primer was prepared in a 1:1 mix ratio, by volume, of curing agent to epoxy monomers. The epoxy-based primer was then applied to the polyethylene terephthalate substrate at a thickness of 20-30 micrometers. The epoxy-based primer was then allowed to cure at room temperature over a period of 48 hours.

DESOTHANE 8800, available from PPG Aerospace, Pittsburgh, Pa., was selected as the polyurethane topcoat. DESOTHANE 8800 comprises a base component, and activator component, and a thinner component. The base component comprises 2-oxypanone, polymer with 2,2-bis(hydroxymethyl)-1,3-propanediol, methyl amyl ketone, and styrene acrylic polymer. The activator comprises a homopolymer of hexamethylene diisocyanate. The thinner component comprises methyl amyl ketone, and ethyl acetate.

A modified stilbene-type fluorescent dye was synthesized and prepared as a dry powder. The modified stilbene-type molecules were prepared having tert-butyl dimethyl silane end groups. The selected end groups were selected to be non-reactive with other components of the polyurethane topcoat. The modified stilbene-type fluorescent dye was added to the thinner component in an amount of 6.3*10^-4 mol/L of the thinner component, which was measured using a conventional fluorescence probe (probe 6 shown in FIG. 14).

The polyurethane topcoat was prepared in a 2:1:1 mix ratio, by volume, of base component to activator component, to thinner. The polyurethane topcoat was then applied to the epoxy-based primer at a thickness of 50-75 micrometers. The polyurethane topcoat was then allowed to cure at room temperature over a period of 48 hours.

Example 4

A coating system of an epoxy based primer and a polyurethane topcoat was prepared on a 0.1 millimeter polyethylene terephthalate substrate. DESOPRIME 7501, available from PPG Aerospace, Pittsburgh, Pa., was selected as the epoxy-based primer. DESOPRIME 7501 comprises a curing agent and epoxy monomers. The curing agent is a mixture of paint solids, n-butyl alcohol, and aliphatic amines. The epoxy monomer comprises bisphenyl A and Epichlorohydrin-based resin in an acetone solvent.

The epoxy-based primer was prepared in a 1:1 mix ratio, by volume, of curing agent to epoxy monomers. The epoxy-based primer was then applied to the polyethylene terephthalate substrate at a thickness of 20-30 micrometers. The epoxy-based primer was then allowed to cure at room temperature over a period of 48 hours.

DESOTHANE 8800, available from PPG Aerospace, Pittsburgh, Pa., was selected as the polyurethane topcoat. DESOTHANE 8800 comprises a base component, and activator component, and a thinner component. The base component comprises 2-oxypanone, polymer with 2,2-bis(hydroxymethyl)-1,3-propanediol, methyl amyl ketone, and styrene acrylic polymer. The activator comprises a homopolymer of hexamethylene diisocyanate. The thinner component comprises methyl amyl ketone, and ethyl acetate.

A modified stilbene-type fluorescent dyes were synthesized and prepared as a dry powder. The modified stilbene-type molecules were prepared having hydroxyl end groups. The selected end groups were selected to be reactive with other components of the polyurethane topcoat. Specifically, the hydroxyl end groups react with the isocyanate group of the pre-polyurethane monomers and become incorporated into the polyurethane chain. The modified stilbene-type fluorescent dye was added to the thinner component in an amount of 7.4*10^-4 mol/L of the thinner component, which was measured using a conventional fluorescence probe (probe 7 shown in FIG. 14).

The polyurethane topcoat was prepared in a 2:1:1 mix ratio, by volume, of base component to activator component, to thinner. The polyurethane topcoat was then applied to the epoxy-based primer at a thickness of 50-75 micrometers. The polyurethane topcoat was then allowed to cure at room temperature over a period of 48 hours.

Cure Characteristics

After mixing the polyurethane and epoxy coatings, liquid samples were measured for cure characteristics in Differential Scanning calorimetry (DSC) using a Netzsch DSC-200 with a Netzsch TASC 414/3 controller (Netzsch Instruments, Burlington, Mass.). Samples were heated in aluminum DSC crucibles at 2 C per minute from 30 C to 200 C. Cured solid epoxy and polyurethane samples were also tested using the same program to measure any residual or incomplete cure behavior.

Figure 13:
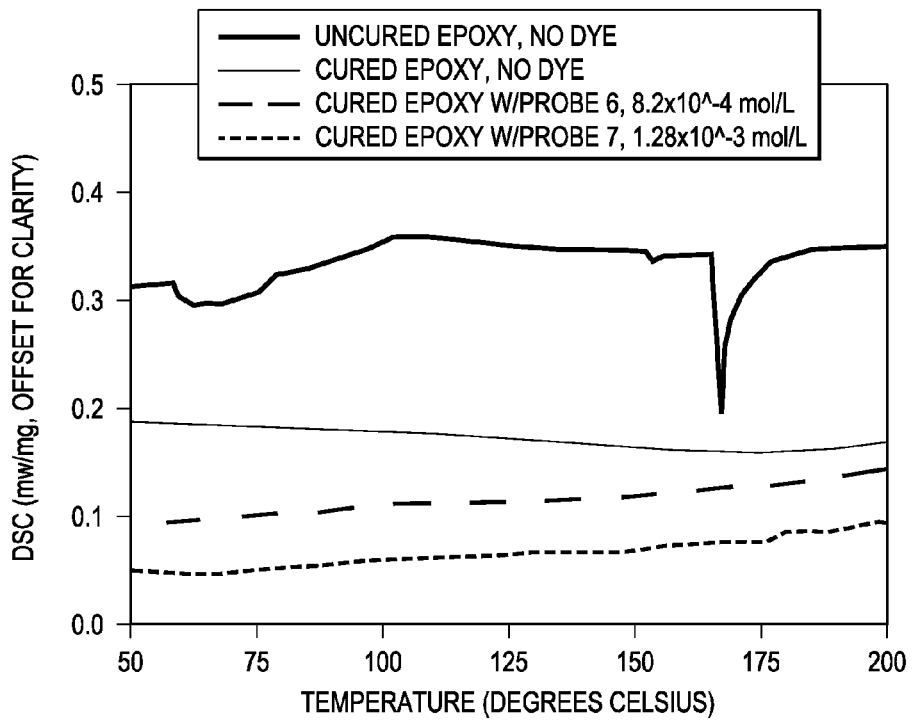
FIG. 13 shows the Differential Scanning calorimetry scans resulting from measurements of uncured and cured epoxy films in accordance with an advantageous embodiment.

FIG. 13 shows the Differential Scanning calorimetry scans resulting from measurements of uncured and cured epoxy films prepared in Example 1 and Example 2.

Figure 14:
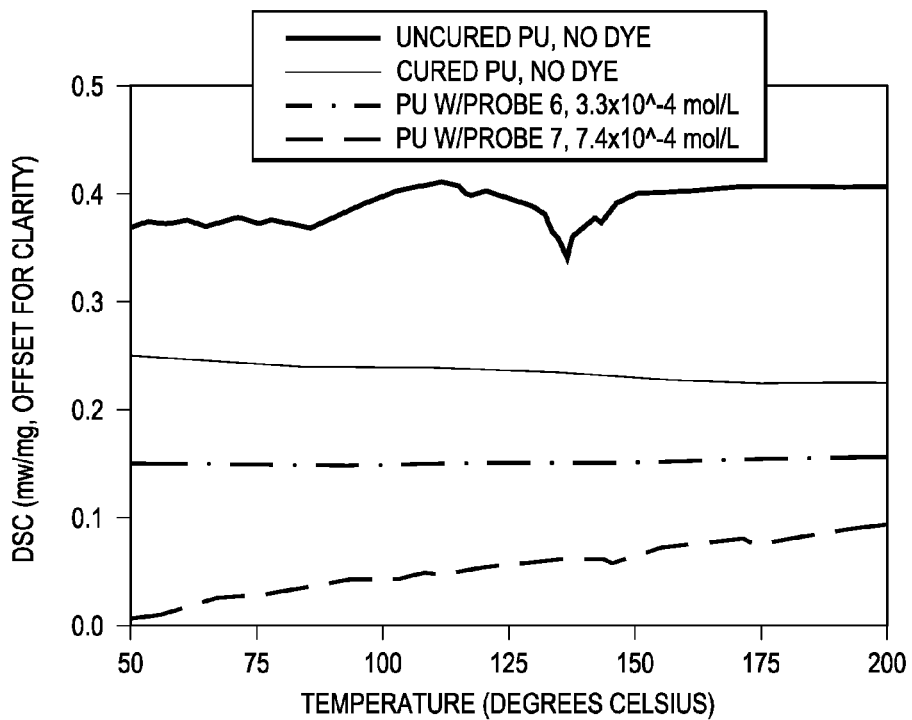
FIG. 14 shows the Differential Scanning calorimetry scans resulting from measurements of uncured and cured polyurethane coatings in accordance with an advantageous embodiment.

FIG. 14 shows the Differential Scanning calorimetry scans resulting from measurements of uncured and cured polyurethane coatings prepared in Example 3 and Example 4.

Cured polyurethane films, both with and without dyes, do not exhibit either exothermic or endothermic behavior. Just as in epoxy coatings, this is taken as evidence that the dye molecules at these concentrations do not unduly hinder the polymerization reaction or the solvent evaporation.

Glass Transition Temperatures

Glass transition temperatures of the coatings were determined using Dynamic Mechanical Analysis (DMA) performed in a PerkinElmer DMA 7e instrument (PerkinElmer Life and Analytical Sciences, Inc., Waltham, Mass.). Cured samples of coatings 1.-0.3 mm in thickness were removed from the PET film. Samples were tested in the DMA for glass transition in 3-point bend configuration with a 10 mm span length. Temperature scans were performed from −50 C to 50 C. 5 samples of each coating and dye combination were tested, and statistical analysis was performed using Student's T-test.

Figure 15:
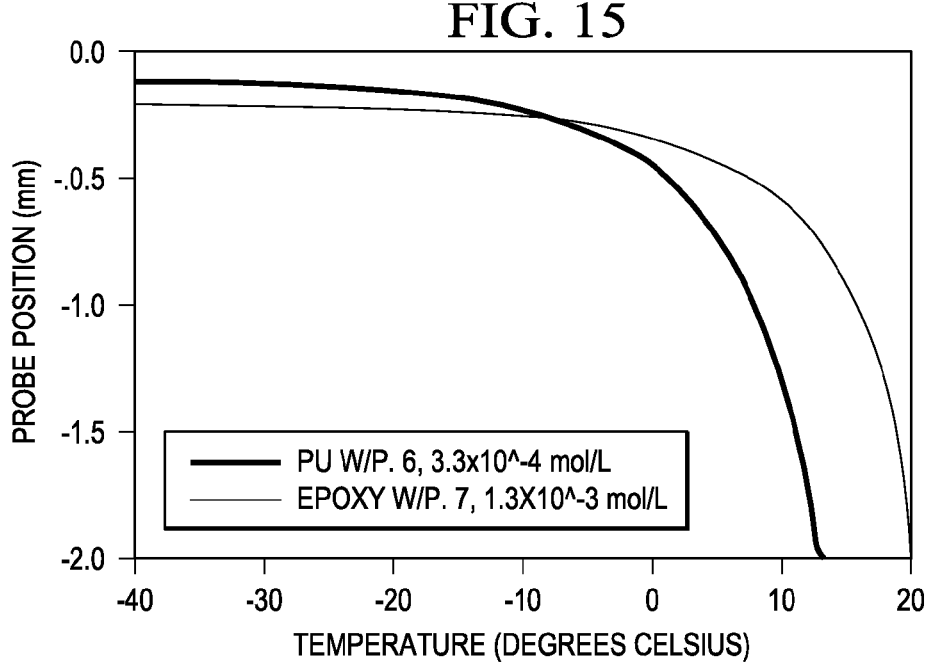
FIG. 15 shows representative plots of the Differential Scanning calorimetry scans taken for epoxy and polyurethane coatings within the incorporated stilbene-type fluorescent dyes in accordance with an advantageous embodiment.

FIG. 15 shows representative plots of the Differential Scanning calorimetry scans taken for epoxy and polyurethane coatings within the incorporated stilbene-type fluorescent dyes.

Figure 16:
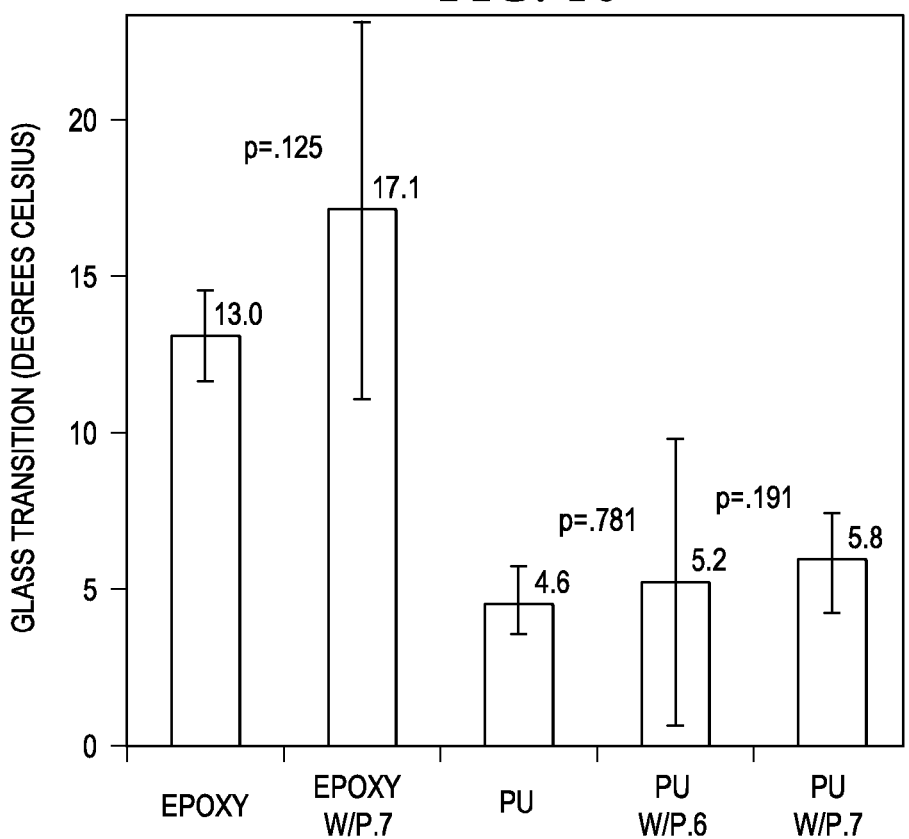
FIG. 16 shows Glass transition temperature measurements of epoxy and polyurethane coatings with and without the incorporated stilbene-type fluorescent dyes in accordance with an advantageous embodiment.

FIG. 16 shows Glass transition temperature measurements of epoxy and polyurethane coatings with and without the incorporated stilbene-type fluorescent dyes. While the dyes appear to cause a slight increase in $T_g$, the variances of the sample sets do not allow that conclusion to be drawn. P-values resulting from a 2-tailed Student's T-test comparing $T_g$ values are shown in the plot. Student's T-test requires p-values to be below at least 0.05 to conclude that two distributions came from different sample sets. Accordingly, the presence of stilbene-type fluorescent dyes in the epoxy and polyurethane coatings at the shown concentrations did not affect the glass transition of the coatings.

Absorbance Spectra

Photoluminescent quantum yield (PLQY) and fluorescence emission spectra were collected using a Hamamatsu Absolute PL Quantum Yield Measurement System available from Hamamatsu K.K. Quantum yield values and PL emission spectra were measured using a fiber optic LED illumination source in an integrating sphere. The illumination wavelength chosen was the maximum absorbance wavelength of the solid polyurethane films, A=498 nm. Each sample was exposed for 44 μs, and results were averaged 200 times. Samples from various locations within the gage length of the tensile specimen were tested. The quantum yield values and peak emission wavelengths were averaged for each tensile specimen.

Figure 17:
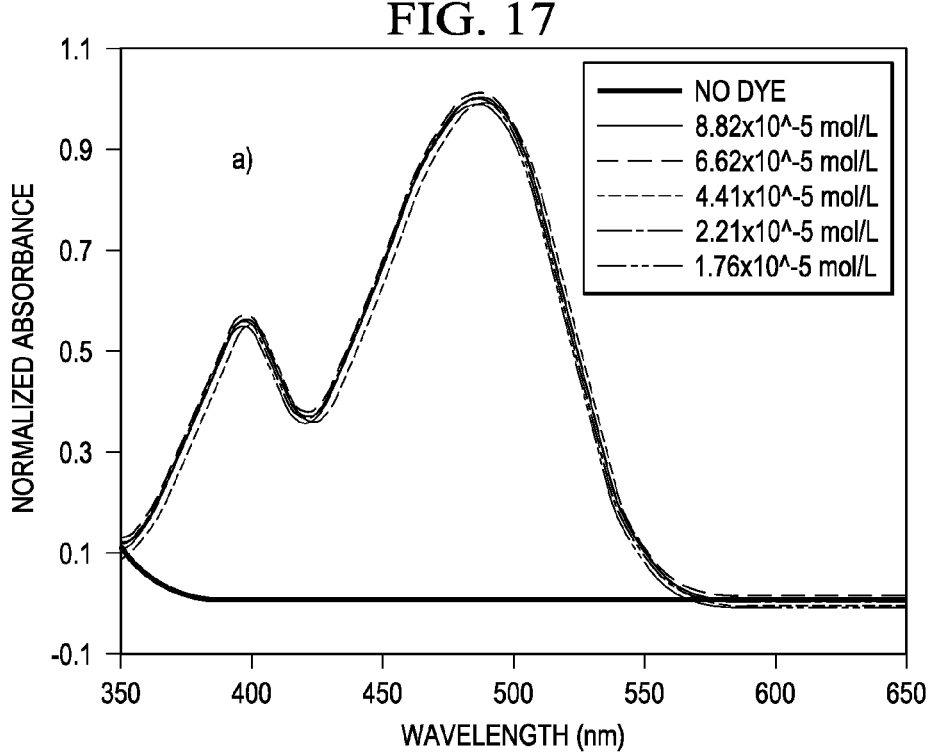
FIG. 17 shows the absorbance spectra for the tetra-butyl dimethyl silane functionalized stilbene dyes at various concentrations in the "thinner" precursor of the polyurethane coating in accordance with an advantageous embodiment.

FIG. 17 shows the absorbance spectra for the tert-butyl dimethyl silane functionalized stilbene dyes at various concentrations in the "thinner" precursor of the polyurethane coating.

Figure 18:
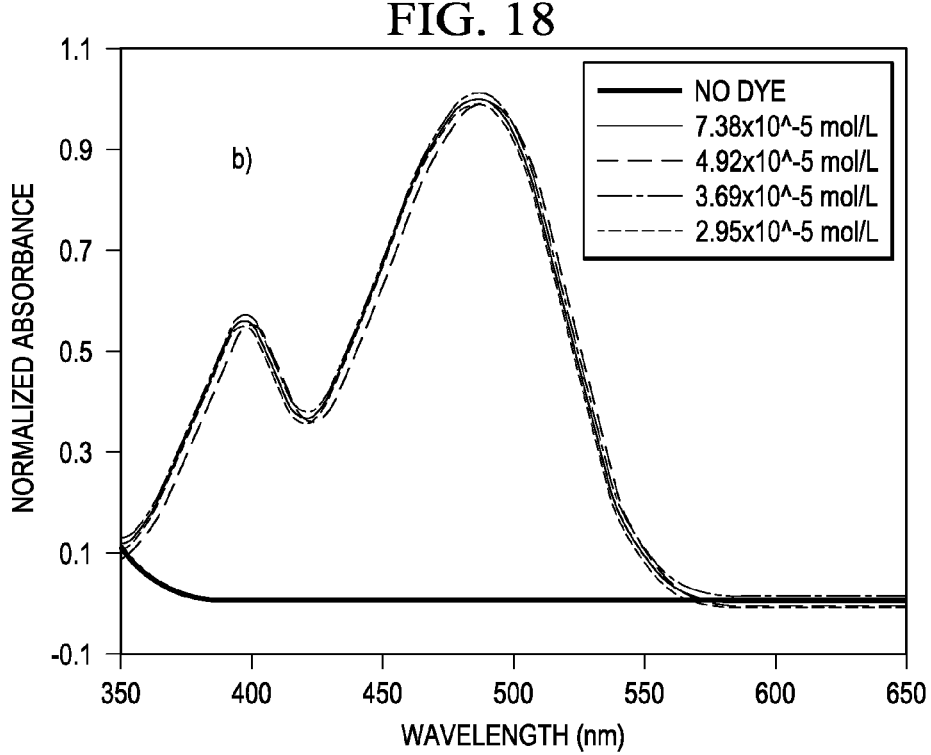
FIG. 18 shows the absorbance spectra for the hydroxyl functionalized stilbene dyes at various concentrations in the thinner precursor of the polyurethane coating in accordance with an advantageous embodiment.

FIG. 18 shows the absorbance spectra for the hydroxyl functionalized stilbene dyes at various concentrations in the "thinner" precursor of the polyurethane coating.

The absorbance spectra of the dyes at various concentrations in liquid dioxin of the epoxy and the methyl amyl ketone, ethyl acetate of the polyurethane was collected for a range including the visible, 250-1100 nm. Spectra were normalized about the dimer absorbance peak wavelength and offset to 0A at 800 nm, well beyond the absorbance activity.

Figure 19:
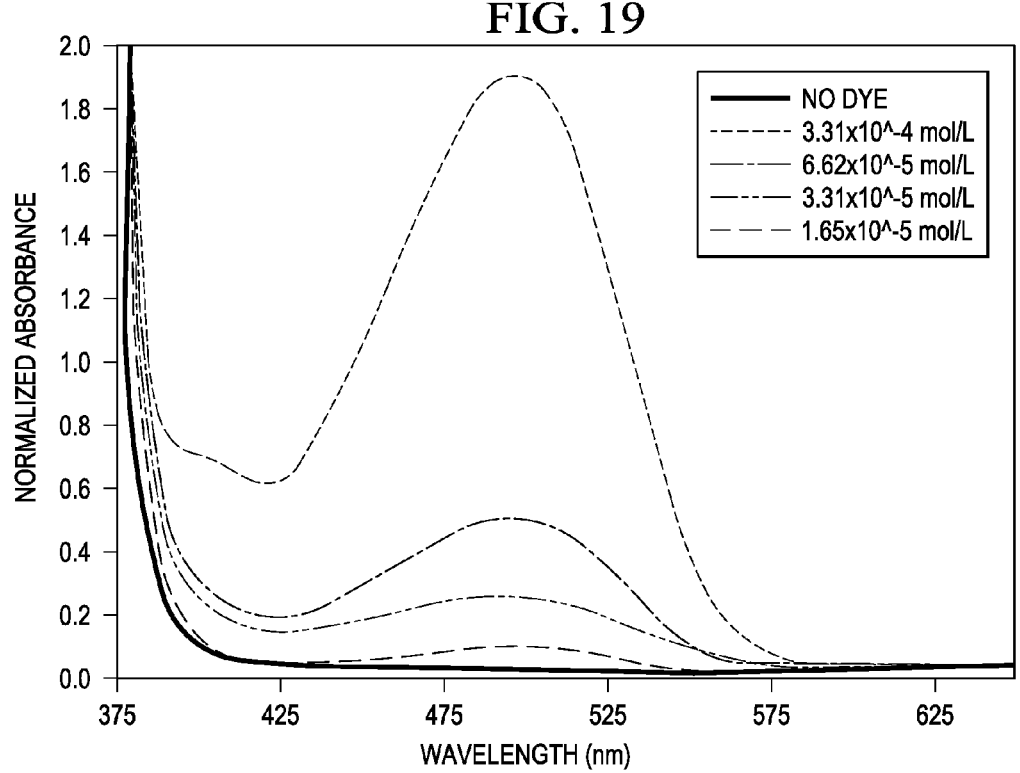
FIG. 19 shows the absorbance of the tert-butyl dimethyl silane functionalized stilbene dyes in solid polyurethane films on glass substrates in accordance with an advantageous embodiment.

FIG. 19 shows the absorbance of the tert-butyl dimethyl silane functionalized stilbene dyes in solid polyurethane films on glass substrates.

The absorbance spectra of the dyes in solid polyurethane films on glass were collected over the same range as in liquid solvents. Film thicknesses were measured and spectra were scaled by the film thickness, and offset to 0A at 800 nm. It was not possible to collect spectra from dyes in the epoxy primer due to the large percentage of paint solids, which scattered or absorbed the incident illumination much too strongly.

Spectra were scaled for variations in film thickness. The hydroxyl functionalized stilbene dyes shows similar absorbance data. The dimer absorbance peak at A=498 nm shows strongly in the solid coatings, indicating that dyes exist in the aggregate state within the solid. The monomer peak at A=395 nm is only weakly visible in the highest concentration of dye. This is partially attributed to the strong absorbance of the polyurethane film itself at wavelengths at or below about 400 nm.

Tensile Testing & Fluorescence Imaging

Figure 20:
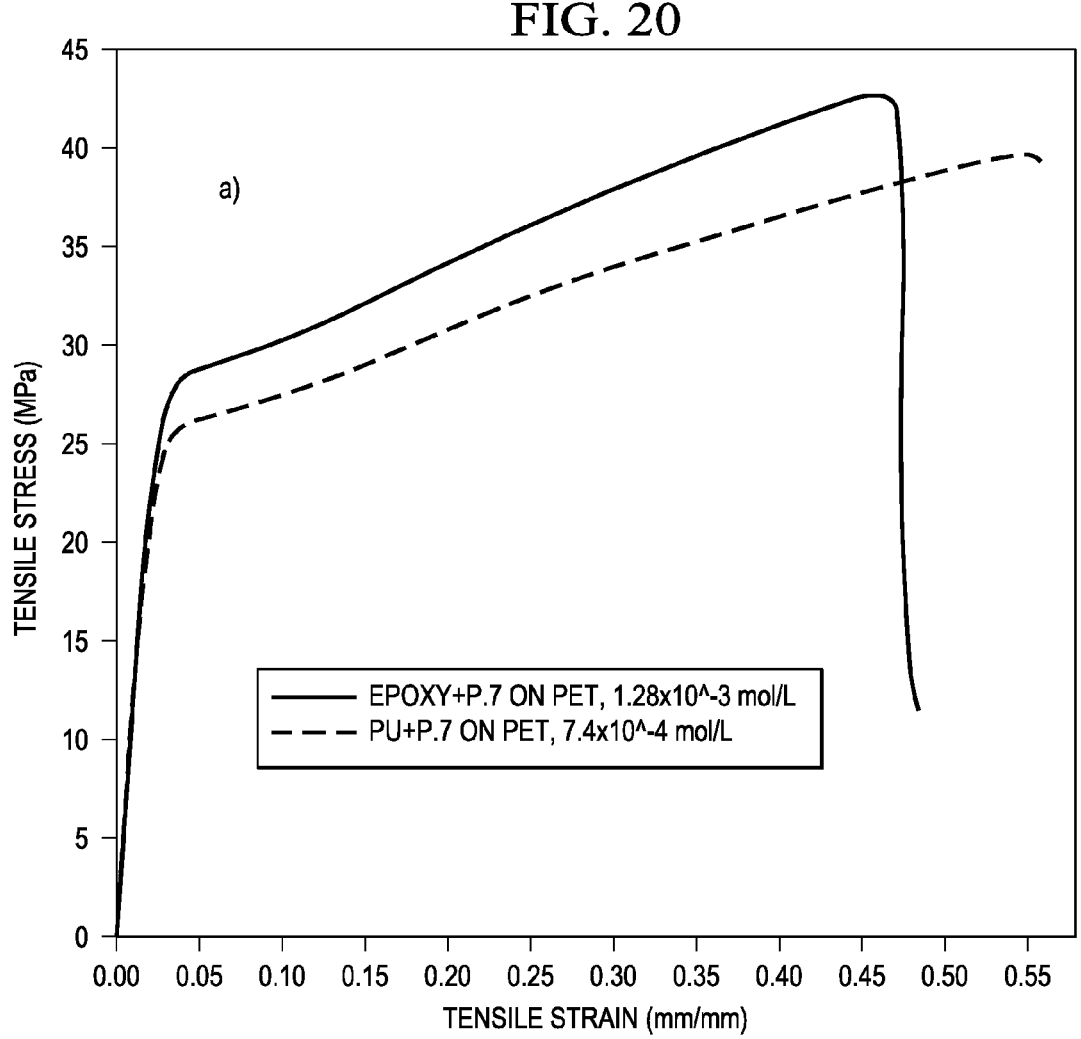
FIG. 20 shows typical stress-strain curves for the PET-epoxy and PET-polyurethane bilayers in accordance with an advantageous embodiment.

FIG. 20 shows typical stress-strain curves for the PET-epoxy and PET-polyurethane bilayers.

Figure 21:
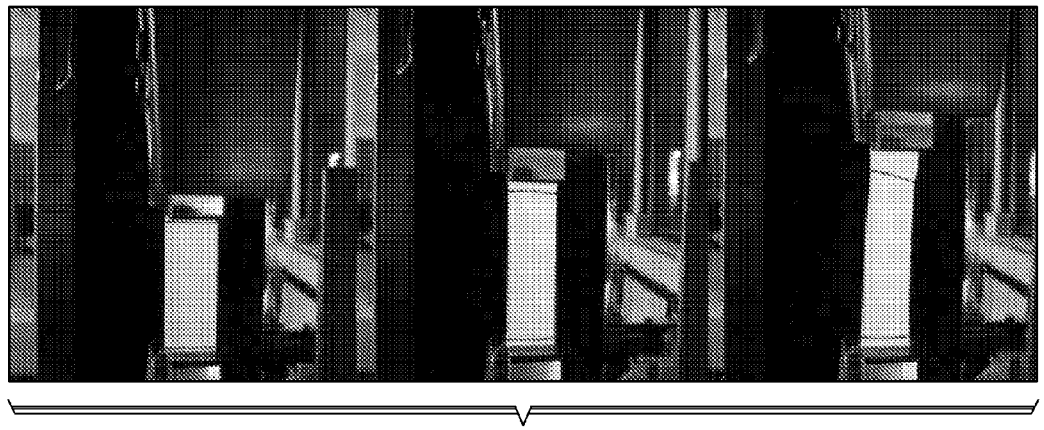
FIG. 21 shows images from a tensile stress test of hydroxyl functionalized stilbene dyes in an epoxy film in accordance with an advantageous embodiment.

FIG. 21 shows images from a tensile stress test of hydroxyl functionalized stilbene dyes in an epoxy film at $1.28 \times 10^{-3}$ mol/L.

The fluorescent images of hydroxyl functionalized stilbene dyes in epoxy show the fluorescence intensity increasing and also shifting wavelength, from reddish-orange to a more light orange color, a shift to lower wavelength emissions. This is consistent with the molecular behavior of the stilbene dyes. When a large number P hydroxyl functionalized stilbene molecules are cross-linked on one side to the coating polymer networks, tensile stress can cause a reduction in aggregation of the stilbene molecules. This reduction increases the relative monomer absorption and emission, resulting in an overall lower wavelength of emitted fluorescence.

Figure 22:
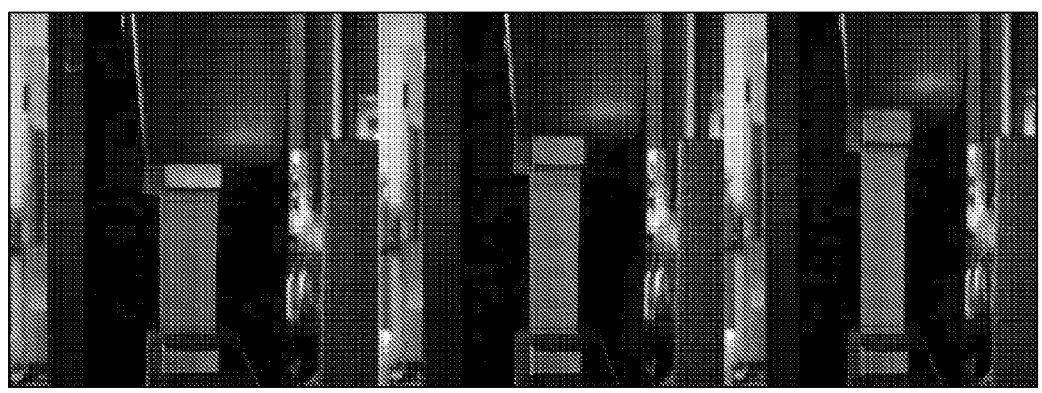
FIG. 22 shows images from a tensile stress test of hydroxyl functionalized stilbene dyes in a polyurethane film in accordance with an advantageous embodiment.

FIG. 22 shows images from a tensile stress test of hydroxyl functionalized stilbene dyes in a polyurethane film at $7.4 \times 10^{-4}$ mol/L.

The images of hydroxyl functionalized stilbene dyes in polyurethane emit more intensely at the highest level of strain than hydroxyl functionalized stilbene dyes in epoxy. This more intense emission is consistent with a shift to higher energy monomeric absorption and emission.

As discussed above, the advantageous embodiments disclosed herein provide an optical witness in the form of stress sensitive fluorescent dyes that are incorporated into a structural repair, and which allow the performance of the repair to be quickly and easily monitored. The stress sensitive fluorescent dyes may be incorporated into the pigment of an appliqué placed over the repair area or into the resin of the surface or overlay ply of the repair. The optical behavior of the fluorescent dyes change as a function of a stress in the repair, thereby providing a visual indication of the changes in the repair.

The description of the different advantageous embodiments has been presented for purposes of illustration and description, and is not intended to be exhaustive or limited to the embodiments in the form disclosed. Many modifications and variations will be apparent to those of ordinary skill in the art.

For example, although an advantageous embodiment has been described with respect to aircraft, the advantageous embodiment may be applied to other types of platforms that may have composite structures. For example, without limitation, other advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of monitoring changes in a patch bonded to a structure, comprising:
   scarfing the patch into the structure, the patch comprising a number of fiber reinforced resin plies scarfed into the structure;
   placing a composite ply over the patch and over a portion of skin of the structure adjacent to the patch, the composite ply comprising a mechanochromatic dye having an optical behavior that varies in response to changes in stress indicated in the composite ply;
   cocuring the composite ply and the patch;
   recording a baseline image representing the optical behavior of the composite ply at a time that the composite ply and the patch are cocured, the baseline image including a first stress profile for the patch as indicated by the composite ply;
   periodically checking the composite ply for changes in the optical behavior of the composite ply including obtaining a new image of the composite ply, the new image representing the optical behavior of the composite ply and including a new stress profile for the patch as indicated by the composite ply, the periodic checking including subjecting the composite ply to electromagnetic energy of a preselected wavelength, and recording the optical behavior of the composite ply, wherein recording the optical behavior of the composite ply includes collecting photoluminescent quantum yield and fluorescence emission spectra from the composite ply; and
   comparing the first stress profile and the new stress profile.

2. The method of claim 1, wherein collecting the photoluminescent quantum yield and the fluorescence emission spectra from the composite ply is performed using a photoluminescent device.

3. The method of claim 1, wherein periodically checking the composite ply further includes:
   marking an area of the structure containing the patch when the optical behavior indicates a change in the stress in the patch arising from delamination between the number of fiber reinforced resin plies of the patch, and
   performing further non-destructive evaluation of the patch using a traditional non-destructive evaluation technique comprising one of bond testing and ultrasonic inspection.

4. The method of claim 1, wherein the mechanochromatic dye is a functionalized stilbene dye having one of tert-butyl dimethylsilane end groups and hydroxyl end groups.

5. A method of repairing an area of an aircraft component, comprising:
   scarfing a patch into a portion of the aircraft component, the patch comprising a number of composite plies of fiber reinforced resin;
   bonding the patch to the aircraft component;
   placing a layer of material over the patch and a portion of a skin of the aircraft in the area, the layer of material having an optical behavior that varies in response to changes in stress in the patch, the layer of material comprising a mechanochromatic dye, in which the mechanochromatic dye is a functionalized stilbene dye having one of tert-butyl dimethylsilane end groups and hydroxyl end groups;
   recording a baseline image of the layer of material representing the optical behavior of the layer of material at a time that the patch is bonded to the aircraft component, the baseline image including a first stress profile for the patch;
   periodically checking performance of the patch by recording subsequent images of the layer of material representing the optical behavior of the layer of material, including obtaining a new image of the layer of material, the new image representing the optical behavior of the patch and including a new stress profile for the patch; and
   comparing the subsequent images to the baseline image and the first stress profile to the new stress profile so as to identify any abnormalities in the new stress profile, wherein the first stress profile and the new stress profile each comprises a mapping of specific fluorescence of the layer of material to areas that exhibit the fluorescence.

6. The method of claim 5, wherein placing the layer of material includes adhering an appliqué to the aircraft component overlying the patch.

7. The method of claim 5, wherein placing the layer of material includes:
   placing a composite ply over the patch, wherein the composite ply comprises fiber reinforced resin, and
   cocuring the composite ply and the patch.

8. The method of claim 5, wherein recording the baseline image and recording the subsequent images each includes:
   subjecting the layer of material to electromagnetic energy of a preselected wavelength, and
   collecting photoluminescent quantum yield and fluorescence emission spectra from the layer of material.

9. The method of claim 5, wherein periodically checking the performance of the patch further includes:
   marking an area of the aircraft component containing the patch when comparison of the subsequent images to the baseline image indicates a change in the stress in the patch, and
   performing further non-destructive evaluation of the patch using a traditional non-destructive evaluation technique comprising one of bond testing and ultrasonic inspection.

10. The method of claim 5, wherein comparing the subsequent images to the baseline image is performed using a data processing system.

11. A method of monitoring changes in a patch bonded to a structure, comprising:
    adhering an appliqué over a patch scarfed to the structure and a skin of the structure adjacent to the patch, the appliqué comprising a mechanochromatic dye having an optical behavior that varies in response to changes in stress to the structure underlying the applique, the mechanochromatic dye incorporated into a pigment of the appliqué, in which the mechanochromatic dye is a functionalized stilbene dye having one of tert-butyl dimethylsilane end groups and hydroxyl end groups, the mechanochromatic dye configured to increase in fluorescence or decrease in fluorescence in response to a change in stress;

recording a baseline image of the applique representing the optical behavior of the applique at a time that the applique is adhered to the structure, the baseline image including a first stress profile for the patch;

periodically checking the appliqué for changes in the optical behavior of the mechnochromatic dye, including obtaining a new image of the applique, the new image representing the optical behavior of the applique and including a new stress profile for the patch, wherein periodically checking the applique further includes: marking an area of the structure containing the applique when the optical behavior indicates a change in the stress in the structure, and performing further non-destructive evaluation of the applique using a traditional non-destructive evaluation technique comprising one of bond testing and ultrasonic inspection; and comparing the first stress profile and the new stress profile to determine any abnormalities, wherein the first stress profile and the new stress profile each comprises a mapping of specific fluorescence of the applique to areas that exhibit the fluorescence.

12. The method of claim 11, wherein periodically checking the applique includes:
   subjecting the applique to electromagnetic energy of a preselected wavelength, and
   recording the optical behavior of the applique.

13. The method of claim 12, wherein recording the optical behavior of the applique includes collecting photoluminescent quantum yield and fluorescence emission spectra from the applique.

14. The method of claim 13, wherein collecting the photoluminescent quantum yield and the fluorescence emission spectra from the applique is performed using a photoluminescent device.

* * * * *